(12) United States Patent
Coletti et al.

(10) Patent No.: US 12,237,134 B2
(45) Date of Patent: Feb. 25, 2025

(54) CIRCUIT PROTECTION FOR HYBRID ANTENNA DISTRIBUTION UNITS

(71) Applicant: RAYCAP IP ASSETS LTD, Nicosia (CY)

(72) Inventors: Charis Coletti, Nea Erythrea (GR); Elias Fermelis, Koropi (GR); Zafiris Politis, St. Stefanos (GR); Kostas Bakatsias, Gerakas (GR)

(73) Assignee: RAYCAP IP ASSETS LTD, Strovolos (CY)

( * ) Notice: Subject to any disclaimer, the term of this patent is extended or adjusted under 35 U.S.C. 154(b) by 426 days.

(21) Appl. No.: 17/563,831

(22) Filed: Dec. 28, 2021

(65) Prior Publication Data
US 2023/0208113 A1  Jun. 29, 2023

(51) Int. Cl.
*H01H 85/20* (2006.01)
*G02B 6/44* (2006.01)
(Continued)

(52) U.S. Cl.
CPC ........ *H01H 85/20* (2013.01); *H01H 71/0271* (2013.01); *H01H 85/0241* (2013.01); *H02B 1/20* (2013.01); *H02B 1/26* (2013.01); *H02H 1/0007* (2013.01); *H02H 7/22* (2013.01); *G02B 6/44265* (2023.05); *G02B 6/4471* (2013.01);
(Continued)

(58) Field of Classification Search
CPC ............... H01H 85/20; H01H 85/0241; H01H 71/0271; H01H 71/08; H01H 39/00; H01H 89/00; H02B 1/20; H02B 1/26; H02H 1/0007; H02H 7/22; H02H 1/0023; H02H 1/0061; G02B 6/44265; G02B 6/4471; H01R 13/68; H01R 9/226; H01R 25/006
See application file for complete search history.

(56) References Cited

U.S. PATENT DOCUMENTS 2,899,160 A  8/1959  Sher
3,066,181 A  11/1962  Archibald
(Continued)

FOREIGN PATENT DOCUMENTS

CA        3046255 A1      6/2018
DE  20 2005 021740 U1    8/2009
(Continued)

OTHER PUBLICATIONS

CPRI Link Mobile Field Testing; AES (Advanced Embedded Solutions), aes-eu.com; Jun. 14, 2014; retrieved from the Internet Jun. 8, 2017 at <http://aes-eu.com/mobile-field-testing.php>; 4 pages.
(Continued)

*Primary Examiner* — Adam B Dravininkas
(74) *Attorney, Agent, or Firm* — Schwabe Williamson & Wyatt

(57) ABSTRACT

Some embodiments of the present disclosure are directed to a hybrid distribution unit that can distribute both power and data connections from a power and fiber cables (or from a hybrid cable containing both power and fiber) within a compact enclosure that helps reduce the overall footprint of the hybrid distribution unit mounted on a cellular tower. Some embodiments may also include circuit protection features, such as fuses or circuit breakers. Other embodiments may be described or claimed.

31 Claims, 23 Drawing Sheets

(51) Int. Cl.
  *H01H 71/02* (2006.01)
  *H01H 85/02* (2006.01)
  *H02B 1/20* (2006.01)
  *H02B 1/26* (2006.01)
  *H02H 1/00* (2006.01)
  *H02H 7/22* (2006.01)
  *H01R 9/22* (2006.01)
  *H01R 13/68* (2011.01)
  *H01R 25/00* (2006.01)

(52) U.S. Cl.
  CPC .............. *H01R 9/226* (2013.01); *H01R 13/68* (2013.01); *H01R 25/006* (2013.01)

(56) References Cited

U.S. PATENT DOCUMENTS

| | | |
|---|---|---|
| 3,165,372 A | 1/1965 | Jacobs |
| 3,247,479 A | 4/1966 | Knipping |
| 3,659,189 A | 4/1972 | Kiviranna |
| 3,659,277 A | 4/1972 | Brown |
| 3,876,076 A | 4/1975 | Hazelhurst |
| 3,936,133 A | 2/1976 | Splitt |
| 3,976,351 A | 8/1976 | Hopfe |
| 4,030,061 A | 6/1977 | Gaskell |
| 4,236,190 A | 11/1980 | Hollingsead |
| 4,918,565 A | 4/1990 | King |
| 4,976,508 A | 12/1990 | Okura |
| 5,030,128 A | 7/1991 | Herron |
| 5,311,397 A | 5/1994 | Harshberger |
| D361,314 S | 8/1995 | Ryan |
| D362,232 S | 9/1995 | Ryan |
| 5,473,244 A | 12/1995 | Libove |
| 5,473,718 A | 12/1995 | Sommer |
| 5,491,766 A | 2/1996 | Huynh |
| 5,530,215 A | 6/1996 | Couvreur |
| 5,533,117 A | 7/1996 | Kim |
| 5,555,153 A | 9/1996 | Frederiksen |
| 5,602,532 A | 2/1997 | Ryan |
| 5,627,721 A | 5/1997 | Figueiredo |
| 5,651,698 A | 7/1997 | Locati |
| 5,701,227 A | 12/1997 | Ryan |
| 5,717,685 A | 2/1998 | Abraham |
| 5,790,360 A | 8/1998 | Ryan |
| 5,805,757 A | 9/1998 | Bloom |
| 5,903,693 A | 5/1999 | Brown |
| 5,914,845 A | 6/1999 | Chase |
| 5,953,193 A | 9/1999 | Ryan |
| 5,966,282 A | 10/1999 | Ryan |
| 5,969,932 A | 10/1999 | Ryan |
| 6,018,452 A | 1/2000 | Meyerhoefer |
| 6,031,706 A | 2/2000 | Nabell |
| 6,037,544 A | 3/2000 | Lee |
| 6,038,119 A | 3/2000 | Atkins |
| 6,074,247 A | 6/2000 | Hall |
| 6,114,632 A | 9/2000 | Planas, Sr. |
| 6,122,156 A | 9/2000 | Nabell |
| 6,125,048 A | 9/2000 | Loughran |
| 6,314,229 B1 | 11/2001 | Sasaki |
| 6,389,214 B1 | 5/2002 | Smith |
| 6,418,262 B1 | 7/2002 | Puetz |
| 6,430,020 B1 | 8/2002 | Atkins |
| 6,501,634 B1 | 12/2002 | Hubbell |
| 6,535,369 B1 | 3/2003 | Redding |
| 6,556,402 B2 | 4/2003 | Kizis |
| 6,608,401 B1 | 8/2003 | Walter |
| 6,623,315 B1 | 9/2003 | Roderick |
| 6,636,409 B2 | 10/2003 | Kladar |
| 6,640,111 B1 | 10/2003 | Shapira |
| 6,654,223 B1 | 11/2003 | Bippus |
| 6,715,619 B2 | 4/2004 | Kim |
| 6,719,615 B1 | 4/2004 | Molnar |
| 6,729,902 B2 | 5/2004 | Martich |
| 6,738,555 B1 | 5/2004 | Cooke |
| 6,748,155 B2 | 6/2004 | Kim |
| 6,763,171 B2 | 7/2004 | D'Inca |
| 6,771,861 B2 | 8/2004 | Wagner |
| 6,792,190 B2 | 9/2004 | Xin |
| 6,804,447 B2 | 10/2004 | Smith |
| 6,809,258 B1 | 10/2004 | Dang |
| 6,813,510 B1 | 11/2004 | Kunzinger |
| 6,851,966 B1 | 2/2005 | Tomasino |
| 6,876,533 B1 | 4/2005 | Ryan |
| 6,937,807 B2 | 8/2005 | Franklin |
| 7,008,256 B2 | 3/2006 | Poiraud |
| 7,035,073 B2 | 4/2006 | Bennett |
| 7,228,047 B1 | 6/2007 | Szilagyi |
| 7,218,828 B2 | 8/2007 | Feustel |
| 7,302,149 B2 | 11/2007 | Swam |
| 7,327,926 B2 | 2/2008 | Barth |
| 7,353,407 B2 | 4/2008 | Diab |
| 7,355,416 B1 | 4/2008 | Darshan |
| 7,376,322 B2 | 5/2008 | Zimmel |
| 7,397,673 B1 | 7/2008 | Wilson |
| 7,417,443 B2 | 8/2008 | Admon |
| 7,433,169 B2 | 10/2008 | Kamel |
| 7,451,329 B2 | 11/2008 | Schindler |
| 7,460,381 B2 | 12/2008 | Lanni |
| 7,508,687 B2 | 3/2009 | Manolescu |
| 7,526,174 B2 | 4/2009 | Leon |
| 7,664,363 B1 | 2/2010 | Mowery, Sr. |
| 7,683,625 B2 | 3/2010 | Milne |
| 7,714,592 B2 | 5/2010 | Radtke |
| 7,739,522 B2 | 6/2010 | Festo |
| 7,768,794 B1 | 8/2010 | Wilson |
| RE41,655 E | 9/2010 | Woodhead |
| 7,834,612 B2 | 11/2010 | Sohnis |
| 7,873,252 B2 | 1/2011 | Smrha |
| 7,894,782 B2 | 2/2011 | Rofougaran |
| 7,946,863 B2 | 5/2011 | Loch |
| 7,949,315 B2 | 5/2011 | Rofougaran |
| 7,972,067 B2 | 7/2011 | Haley |
| 8,021,189 B2 | 9/2011 | Zayas |
| 8,111,966 B2 | 2/2012 | Holmberg |
| 8,121,457 B2 | 2/2012 | Zimmel |
| 8,180,192 B2 | 5/2012 | Zimmel |
| 8,279,067 B2 | 10/2012 | Berger |
| 8,314,583 B2 | 11/2012 | Yohanan |
| 8,383,521 B2 | 2/2013 | Nishimura |
| 8,401,497 B2 | 3/2013 | Rofougaran |
| 8,401,501 B2 | 3/2013 | Rofougaran |
| 8,412,385 B2 | 4/2013 | Brumett, Jr. |
| 8,457,461 B2 | 6/2013 | Ott |
| 8,467,655 B2 | 6/2013 | German |
| 8,490,799 B2 | 7/2013 | Knight |
| 8,521,100 B2 | 8/2013 | Rofougaran |
| 8,620,549 B2 | 8/2013 | Rofougaran |
| 8,526,200 B2 | 9/2013 | Miller |
| 8,526,893 B2 | 9/2013 | Rofougaran |
| 8,547,164 B2 | 10/2013 | Flores |
| 8,552,749 B2 | 10/2013 | Heath |
| 8,566,627 B2 | 10/2013 | Halepete |
| 8,576,873 B2 | 11/2013 | Diab |
| 8,577,359 B2 | 11/2013 | Wesby |
| 8,588,606 B2 | 11/2013 | Watte |
| 8,600,318 B2 | 12/2013 | Rofougaran |
| 8,730,639 B1 | 5/2014 | Wilson |
| 8,754,622 B2 | 6/2014 | Dobkin |
| 8,779,786 B2 | 7/2014 | Maniktala |
| 8,780,519 B2 | 7/2014 | Miller |
| 8,810,990 B1 * | 8/2014 | Miller ................. H01T 4/06 361/119 |
| 8,831,395 B2 | 9/2014 | Sievers |
| 8,839,594 B2 | 9/2014 | Smith |
| 8,873,926 B2 | 10/2014 | Beamon |
| 8,938,143 B2 | 1/2015 | Do |
| 8,989,548 B2 | 3/2015 | Kopf |
| 8,995,106 B2 | 3/2015 | Miller |
| 9,049,500 B2 | 6/2015 | Conner |
| 9,057,862 B2 | 6/2015 | Strasser |
| 9,099,860 B2 | 8/2015 | Martinez |
| 9,140,872 B2 | 9/2015 | Sedor |
| 9,179,500 B2 | 11/2015 | Yu |
| 9,207,735 B2 | 12/2015 | Khaitan |

(56) References Cited

U.S. PATENT DOCUMENTS

| | | |
|---|---|---|
| 9,281,866 B2 | 3/2016 | Smentek |
| 9,448,576 B2 | 9/2016 | Chamberlain |
| 9,575,277 B2 | 2/2017 | Bakatsias |
| 9,634,844 B2 | 4/2017 | Paul |
| 9,640,986 B2 | 5/2017 | Politis |
| 9,673,904 B2 | 6/2017 | Palanisamy |
| 10,025,335 B2 | 7/2018 | Chamberlain |
| 10,027,108 B2 | 7/2018 | Peach |
| 10,181,717 B2 | 1/2019 | Miller et al. |
| 10,257,056 B2 | 4/2019 | Hazani |
| 10,429,604 B2 | 10/2019 | Bakatsias |
| 10,782,720 B2 | 9/2020 | Guerin |
| 11,677,164 B2 | 6/2023 | Fermelis |
| 2001/0053971 A1 | 12/2001 | Demetrescu |
| 2002/0048133 A1 | 4/2002 | Jakwani |
| 2002/0055306 A1 | 5/2002 | Jenks |
| 2002/0150372 A1 | 10/2002 | Schray |
| 2002/0196593 A1 | 12/2002 | Kizis |
| 2003/0027521 A1 | 2/2003 | Yip |
| 2003/0085621 A1 | 5/2003 | Potega |
| 2003/0113086 A1 | 6/2003 | Jun |
| 2003/0148668 A1 | 8/2003 | Lias |
| 2004/0119386 A1 | 6/2004 | Guidez |
| 2004/0198451 A1 | 10/2004 | Varghese |
| 2004/0233605 A1 | 11/2004 | Dabrowski |
| 2004/0246693 A1 | 12/2004 | Lloyd |
| 2005/0036262 A1 | 2/2005 | Siebenthall |
| 2005/0042920 A1 | 2/2005 | Poiraud |
| 2005/0094359 A1 | 5/2005 | Lee |
| 2005/0157461 A1 | 7/2005 | Cauthron |
| 2005/0220021 A1 | 10/2005 | Sosnowski |
| 2005/0231872 A1 | 10/2005 | Schimanski |
| 2005/0271344 A1* | 12/2005 | Grubish ............... G02B 6/445 385/135 |
| 2006/0139836 A1 | 6/2006 | Anthony |
| 2006/0153362 A1 | 7/2006 | Bloodworth |
| 2007/0024372 A1 | 2/2007 | Hagen |
| 2007/0093204 A1 | 4/2007 | Kincade |
| 2007/0163801 A1 | 7/2007 | Coffey |
| 2007/0217101 A1 | 9/2007 | Carter |
| 2008/0037188 A1 | 2/2008 | Wilson |
| 2008/0055822 A1 | 3/2008 | Rearick |
| 2008/0106881 A1 | 5/2008 | Tari |
| 2008/0117555 A1 | 5/2008 | Wilson |
| 2008/0139045 A1 | 6/2008 | Ho |
| 2008/0186667 A1 | 8/2008 | Verdelli |
| 2008/0247112 A1 | 10/2008 | Benedetto |
| 2008/0272654 A1 | 11/2008 | Lontka |
| 2008/0278889 A1 | 11/2008 | Briggs |
| 2008/0298762 A1 | 12/2008 | Hawley |
| 2008/0310060 A1 | 12/2008 | Metral |
| 2009/0103218 A1 | 4/2009 | Ryan |
| 2009/0103881 A1 | 4/2009 | Gonzalez |
| 2009/0226143 A1 | 9/2009 | Beck |
| 2009/0238531 A1 | 9/2009 | Holmberg |
| 2009/0257727 A1 | 10/2009 | Laurisch |
| 2010/0034507 A1 | 2/2010 | Sielaff |
| 2010/0054676 A1 | 3/2010 | Cooke |
| 2010/0181840 A1 | 7/2010 | Coulson |
| 2010/0259871 A1 | 10/2010 | Ewing |
| 2011/0101937 A1 | 5/2011 | Dobkin |
| 2011/0135316 A1 | 6/2011 | Fankhauser |
| 2011/0237299 A1 | 9/2011 | Boss |
| 2011/0262146 A1 | 10/2011 | Khemakhem |
| 2012/0043432 A1 | 2/2012 | Heitmeyer |
| 2012/0051710 A1 | 3/2012 | Zeng |
| 2012/0069882 A1 | 3/2012 | Nino |
| 2012/0092835 A1* | 4/2012 | Miller ............... H01R 4/5008 439/864 |
| 2012/0114295 A1 | 5/2012 | Guzzo |
| 2012/0200978 A1 | 8/2012 | Miller |
| 2012/0200979 A1* | 8/2012 | Miller ............... H02H 9/041 361/119 |
| 2012/0230636 A1 | 9/2012 | Blockley |
| 2012/0269509 A1 | 10/2012 | Hultermans |
| 2012/0317426 A1 | 12/2012 | Hunter, Jr. |
| 2012/0319485 A1 | 12/2012 | Ewing |
| 2013/0003677 A1 | 1/2013 | Yu |
| 2013/0039629 A1 | 2/2013 | Krampotich |
| 2013/0051440 A1 | 2/2013 | Rofougaran |
| 2013/0084050 A1 | 4/2013 | Vastmans |
| 2013/0108227 A1 | 5/2013 | Conner |
| 2013/0114930 A1 | 5/2013 | Smith |
| 2013/0146355 A1 | 6/2013 | Strasser |
| 2013/0170801 A1 | 7/2013 | Do |
| 2013/0215804 A1 | 8/2013 | Lu |
| 2013/0294735 A1 | 11/2013 | Burris |
| 2013/0308915 A1 | 11/2013 | Buff |
| 2013/0340361 A1 | 12/2013 | Rogers |
| 2014/0044400 A1 | 2/2014 | Anguiano |
| 2014/0168842 A1* | 6/2014 | Martinez ............... H02H 9/04 361/91.1 |
| 2014/0219622 A1 | 8/2014 | Coan |
| 2014/0248028 A1 | 9/2014 | Campbell |
| 2014/0268597 A1 | 9/2014 | Lebo |
| 2014/0314388 A1 | 10/2014 | Alberts |
| 2014/0376909 A1 | 12/2014 | Frisken |
| 2015/0006095 A1 | 1/2015 | Voisine |
| 2015/0109710 A1 | 4/2015 | Politis |
| 2015/0155669 A1* | 6/2015 | Chamberlain ......... H01Q 1/246 439/507 |
| 2015/0155706 A1 | 6/2015 | Miller |
| 2015/0168974 A1 | 6/2015 | Mascarenhas |
| 2015/0234399 A1 | 8/2015 | Chamberlain |
| 2015/0234405 A1 | 8/2015 | Chamberlain |
| 2015/0334476 A1 | 11/2015 | Smith |
| 2016/0043806 A1 | 2/2016 | Maricevic |
| 2016/0139355 A1 | 5/2016 | Petersen |
| 2016/0156162 A1 | 6/2016 | Yamaguchi |
| 2016/0231524 A1 | 8/2016 | Womack |
| 2016/0276817 A1 | 9/2016 | Wang |
| 2016/0342168 A1 | 11/2016 | Chamberlain |
| 2017/0123175 A1 | 5/2017 | Van Baelen |
| 2018/0090895 A1 | 3/2018 | Wang |
| 2018/0157000 A1 | 6/2018 | Miller |
| 2018/0159319 A1 | 6/2018 | Miller |
| 2018/0173263 A1 | 6/2018 | Chamberlain |
| 2018/0213091 A1 | 7/2018 | Kostakis |
| 2018/0231731 A1 | 8/2018 | Bakatsias |
| 2018/0254629 A1 | 9/2018 | Gattis |
| 2018/0341072 A1* | 11/2018 | Marcouiller ......... G02B 6/4472 |
| 2019/0258280 A1 | 8/2019 | Chamberlain |
| 2020/0076187 A1* | 3/2020 | Warner ............. G02B 6/44524 |
| 2021/0091481 A1 | 3/2021 | Fermelis et al. |

FOREIGN PATENT DOCUMENTS

| | | |
|---|---|---|
| DE | 698717 B1 | 10/2009 |
| DE | 102012008923 B4 | 9/2014 |
| DE | 102011111288 B4 | 3/2018 |
| DE | 102011111399 B4 | 5/2018 |
| EP | 0 095 539 A1 | 12/1983 |
| EP | 0660287 A1 | 6/1995 |
| EP | 0 942 303 A1 | 9/1999 |
| EP | 1139533 A2 | 10/2001 |
| EP | 1139533 A3 | 12/2002 |
| EP | 1 855 365 A1 | 11/2007 |
| EP | 2005854158 | 11/2007 |
| EP | 2 469 661 A1 | 6/2012 |
| EP | 2536035 A1 | 12/2012 |
| EP | 3661079 A1 | 6/2020 |
| EP | 3798706 A1 | 3/2021 |
| GB | 0637657 A | 5/1950 |
| GB | 2421641 A | 6/2006 |
| GB | 2452780 A | 3/2009 |
| JP | S6250711 A1 | 3/1987 |
| JP | 2005 317472 A | 11/2005 |
| KR | 10-2010-0048227 A | 5/2010 |
| KR | 10-2010-0069332 A | 6/2010 |
| WO | 2006/076120 A1 | 7/2006 |
| WO | 2008/059212 A1 | 5/2008 |
| WO | 2008/135774 A1 | 11/2008 |
| WO | 2010/024847 A2 | 3/2010 |
| WO | 2012/038104 A1 | 3/2012 |

(56) References Cited

FOREIGN PATENT DOCUMENTS

| WO | 2012/108929 A1 | 8/2012 |
|---|---|---|
| WO | 2012/108930 A1 | 8/2012 |
| WO | 2013/055591 A2 | 4/2013 |
| WO | 2013/165657 A1 | 11/2013 |
| WO | 2014/009255 A1 | 1/2014 |
| WO | 2014/118227 A1 | 8/2014 |
| WO | 2014/134154 A1 | 9/2014 |
| WO | 2016/130322 A1 | 8/2016 |
| WO | 2018/136812 A1 | 7/2018 |

OTHER PUBLICATIONS

Extended European Search Report for EP Application No. 20198469.7 dated Feb. 12, 2021; 7 pages.
FIS, the Solutionists, "High Density C-ran CPRI Interface Panel" Product Catalog, Rev. A; May 2015; Oriskany, New York; 2 pages.
FIS, the Solutionists, CPRI Interface Panel Drawer with Integrated Cable Management; Sep. 27, 2015; ubeity.squarespace.com; Rev. A 3-2; 2 pages.
GE Product Data Sheet, CP2000DC54-PE Compact Power Line DC/DC Converter, Aug. 20, 2013, www.ge.com/powerelectronics; 15 pages.
International Preliminary Report on Patentability and Written Opinion of the International Searching Authority for PCT/US2011/064704; Date of mailing Aug. 22, 2013; 8 pages.
International Preliminary Report on Patentability and Written Opinion of the International Searching Authority for PCT/US2011/064717 dated Aug. 22, 2013; 8 pages.
Keithley Product Sheet, Single-Channel Programmable DC Power Supplies, Series 2200, undated; www.keithly.com; 4 pages.
Müller, Ulrich, Deploying and Managing New Cell Sites with FRR; Apr. 4, 2015; Telcom Infra Event; <http://telecominfraonline.nl/deploying-managing-new-cell-sites/>; 21 pages.
Partial European Search Report for EP Application No. 18742120.1 dated Sep. 4, 2020; 23 pages.
Williams, et al. "2-Wire Virtual Remote Sensing for Voltage Regulators—Clairvoyance Marries Remote Sensing" Linear Technology Brochure, Application Note 126, Oct. 2010; www.linear.com; pp. AN126-1-AN126-22.
Avitec CSHP902 Repeater—User, Operation and Maintenance Manual 2001; 55 pages.
Davis, "Controller IC Eliminates Remote Sense Lines for Long Cable Runs" Power Electronics Technology May 2010; pp. 26-28.
Grcev et al., "Lightning Current Distribution to Ground at a Power Line Tower Carrying a Radion Base Station" IEEE Transactions on Electromagnetic Compatibility, vol. 47, No. 1, Feb. 2005; 11 pages.
Littelfuse, Application Note: Distributed Base Stations; Oct. 2012; 8 pages.
Noori, et al., "The RF Power Behind Design Innovation" Microwave Design White Paper; May 2007; 8 pages.
Noritake et al., "Evaluation Results of Power Supply to ICT Equipment Using HVDC Distribution System" Intelec, Jun. 10, 2010, pp. 1-8.
Patil et al., "Base Transceiver Station (BTS) Safety and Fault Management" International Journal of Innovative Technology and Exploring Engineering (IJITEE); ISSN: 2278-3075, vol. 3, Issue—7; Dec. 2013; pp. 48-52.
Rahman, "Overview of energy saving aspects in 2G and 3G Mobile Communication Networks" Nov. 2009; 65 pages.
Williams et al., "2-Wire Virtual Remote Sensing for Voltage Regulators" Application Note 126; Oct. 2010; 22 pages.
Hameg Instruments "Programmable Power Supply HM7044" May 2001; 20 pages.
Alvarion BreezeMAX Extreme—System Manual (Preliminary) Jun. 2009; 206 pages.
"Relay" from Wikipedia. Downloaded Oct. 30, 2009.
International Search Report and Written Opinion for PCT/US2011/064704; Date of mailing: May 16, 2012; 12 pages.
International Search Report and Written Opinion for PCT/US2011/064717 dated May 16, 2012; 13 pages.
International Search Report and Written Opinion for PCT/US2015/013740 dated Apr. 28, 2015; 17 pages.
International Search Report and Written Opinion for PCT/US2016/022575 dated Aug. 17, 2016; 14 pages.
International Search Report and Written Opinion for PCT/US2018/014553 dated Apr. 6, 2018; 11 pages.
Extended European Search Report for EP Application No. 22215899.0 dated May 9, 2023; 9 pages.

\* cited by examiner

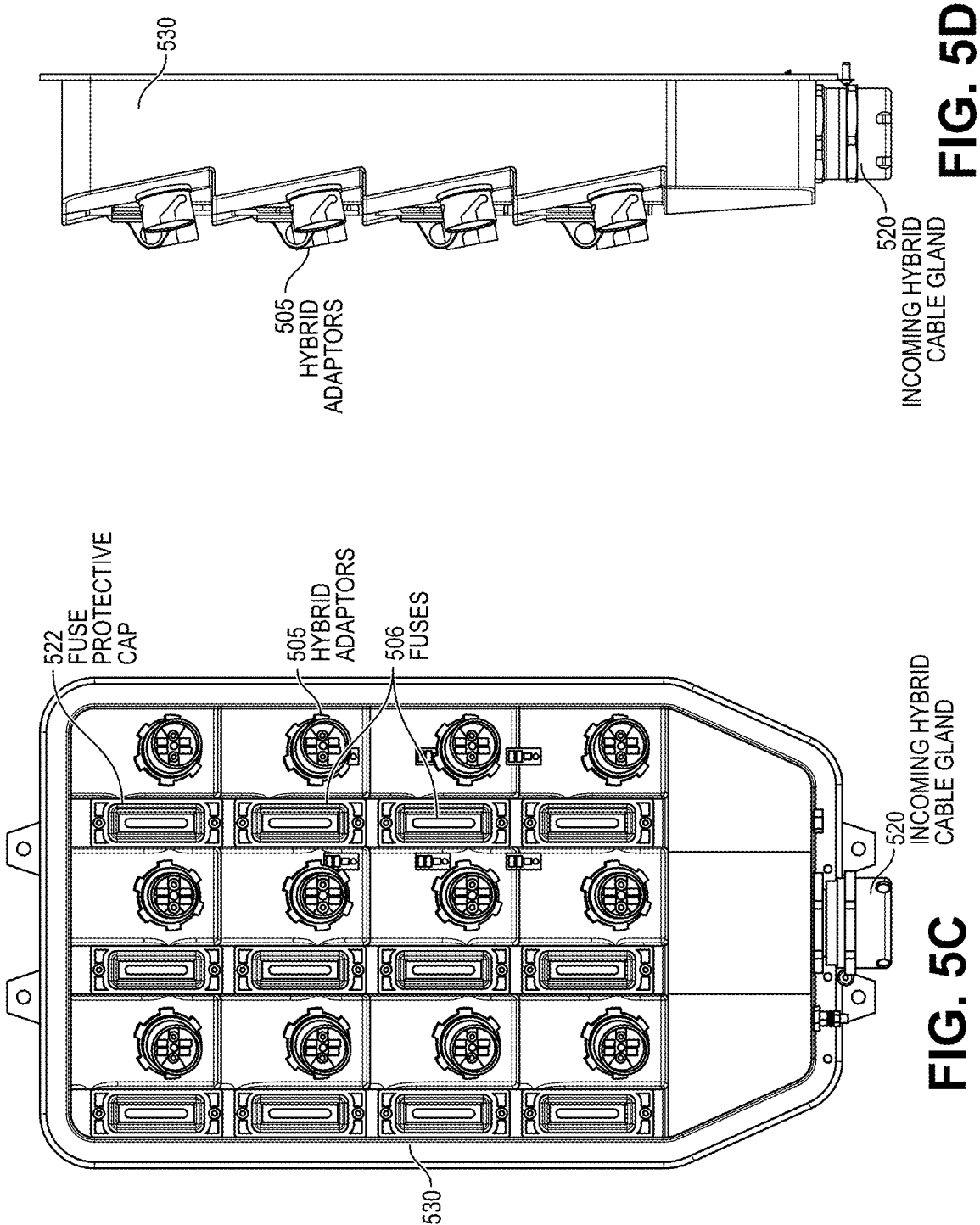

CIRCUIT PROTECTION FOR HYBRID ANTENNA DISTRIBUTION UNITS

CROSS-REFERENCE TO RELATED APPLICATION

The present application is related to U.S. patent application Ser. No. 17/029,877 filed Sep. 23, 2020 and entitled "HYBRID ANTENNA DISTRIBUTION UNIT," the entire disclosure of which is incorporated herein by reference in its entirety.

BACKGROUND

Cellular tower sites are increasingly distributed around the world to provide mobile communications for a variety of devices. Such sites typically include a radio unit with an antenna, where this radio unit is supplied power by an input power cable (e.g., at −48 volts DC) and a return cable back to a power supply located in a shelter. Additionally, data is communicated between one or more base station units (also located in the shelter) and the radio unit over fiber optic cabling.

The cellular site also performs various processing to, for example, determine the appropriate frequency band for a transmission, amplify a signal, transmit and receive signals, etc. In older networks, this type of processing was typically done at the base inside the shelter, but after the introduction of third-generation (3G) and fourth-generation (4G) networks, at least some such processing (e.g., signal amplification) has largely been moved from the base station unit in the shelter to a processing unit located near the top of the cellular tower, since a considerable amount of energy would otherwise be lost via the radio frequency (RF) cable connection between the base station unit and the antenna(s) at the top of the tower.

However, while performing the amplification process at the top of the tower near the antenna helps to minimize energy loss, additional power and fiber optic cabling is required to supply power and data from the shelter to the unit on the tower. Conventional processing units are thus susceptible to damage and disruption from overvoltage and surge current when a lightning strike hits the tower (or nearby). Additionally, towers may host a number of different radio/antenna combinations, thus providing an issue for routing multiple DC link cables to fit the radios, and protecting the connections from overvoltage.

In some cases, hybrid cables are used in cellular sites to combine both fiber and power conductors. Inside such hybrid cables, there are copper wires that feed several radios with power, along with fiber optic cabling to provide a data connection to the radios. Typically, the hybrid cable is terminated in an enclosure and individual surge protectors are provided for each of the DC circuits that feed the radio. The fibers from the fiber optic cabling are terminated inside the enclosure and fiber jumpers are used to connect them to the radios. Likewise, power jumpers are used to connect the power wiring to each radio to the enclosure. An example of a cable breakout assembly is described in U.S. Pat. No. 9,575,277, the entire disclosure of which is incorporated by reference herein in its entirety.

One significant issue arising in conventional cellular sites is that the space available for the fiber optic breakout assembly (and other components) is extremely limited on the cellular tower, and this space is often costly for cellular operators to rent from owners of the tower. Embodiments of the present disclosure address this issue (among others) by providing a hybrid distribution unit that can distribute both power and data connections from a power and fiber cables (or from a hybrid cable containing both power and fiber) within a compact enclosure that helps reduce the overall footprint of the hybrid distribution unit mounted on a cellular tower. Some embodiments may additionally include circuit protection features, such as fuses or circuit breakers.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 5A-5D illustrate examples of a hybrid distribution unit utilizing fuses in accordance with various embodiments of the disclosure.

DETAILED DESCRIPTION

Figure 1:
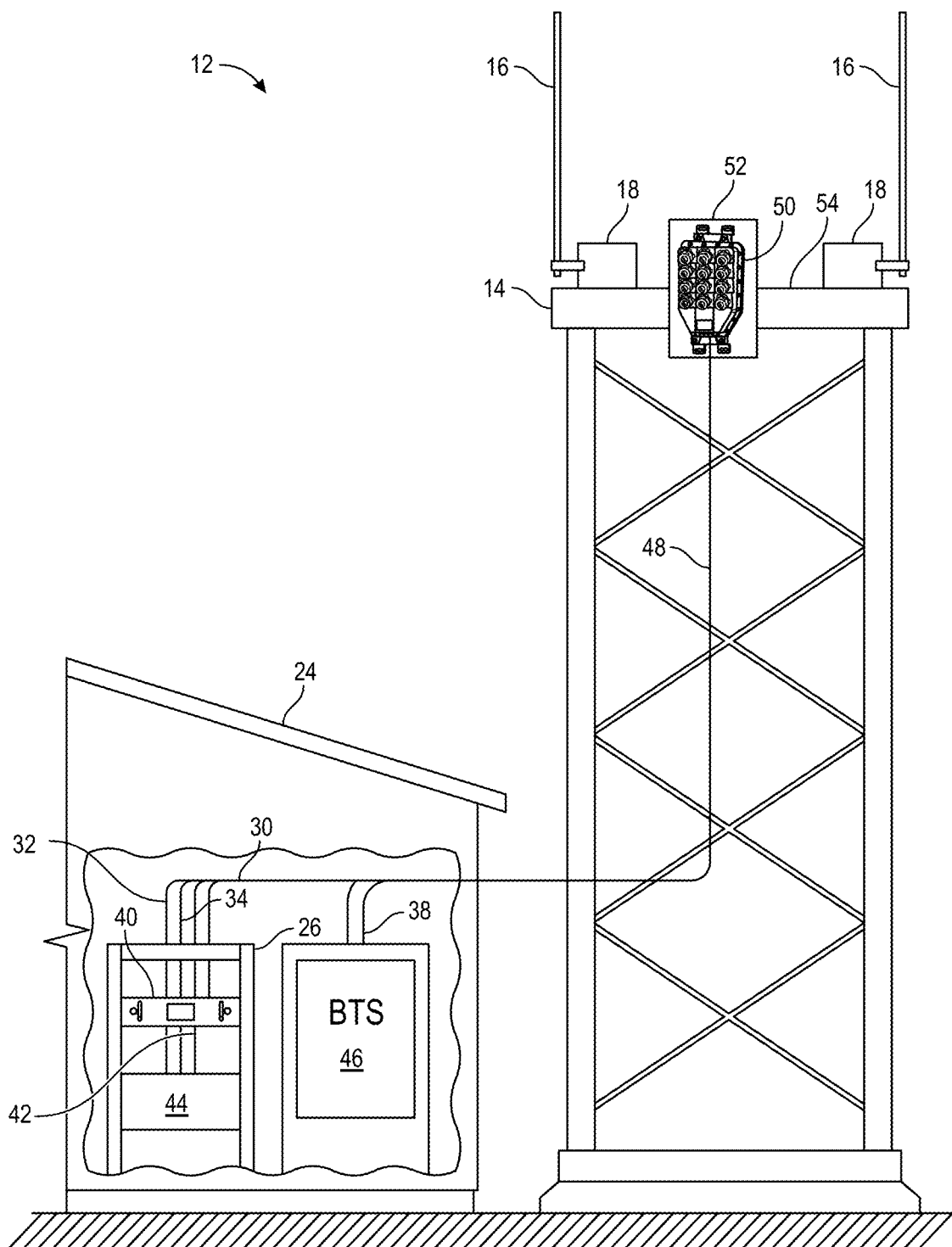
FIG. 1 illustrates an example of a power and communication system in accordance with various embodiments of the disclosure.

FIG. 1 illustrates one example of a power and communication system 12 that provides suppression for a distributed wireless communication station. A building 24 contains computing equipment for a base transceiver communication station (BTS) 46, which may also be referred to herein as a "baseband unit." Communication station 46 is connected through fiber optic cables 38 to different radios 18 (also referred to herein as "remote radio units") located on the top of a tower 14. A Direct Current (DC) power plant 44 is connected through a DC power bus 42 and DC power cables 30 to the different radios 18 on tower 14. The power plant 44 may also be referred to herein as a "power supply unit." In one example, DC power cables 30 include sets of −48 DC volt power cables 32, return power cables 34, and associated ground cables. In one example, power cables 30 and fiber optic cables 38 are run through a same hybrid trunk cable 48 that is routed out of building 24 and up tower 14 to a hybrid antenna distribution unit 50.

A local base suppression unit 40 may be located inside of building 24 and connected to the local ends of power cables 30 relatively close to DC power plant 44 and communication station 46. In one embodiment, base suppression unit 40 is located in a rack 26 that also contains DC power plant 44. In another example, base suppression unit 40 is located in another rack or some other location next to power plant 44. Examples of base suppression units are described in U.S. Pat. No. 10,181,717 which is incorporated by reference in its entirety.

Hybrid antenna distribution unit (also referred to herein as a "hybrid distribution unit") 50 is attached to a support 52 on top of tower 14 and is connected to the remote ends of power cables 30 and fiber optic cables 38 proximate to radios 18 and antennas 16. In one example, distribution unit 50 is located within 2 meters of radios 18.

The hybrid distribution unit may also be referred to herein as a hybrid fiber to the antenna (FTTA)/power to the antenna (PTTA) distribution unit. As illustrated in FIG. 1, the hybrid distribution unit 50 may be installed on a mobile communications tower or mast (such as tower 14) to provide for the connection and distribution of the hybrid trunk cable 47 to the jumpers 54 coupled to the remote radio units 18. As described in more detail, below, the hybrid distribution unit 50 also provides integrated over voltage protection (OVP) modules to help protect the remote radio units 18 (also referred to herein as "RRUs").

Among other things, hybrid FTTA/PTTA distribution units of the present disclosure help provides higher installation capacity compared to conventional distribution units, as the hybrid distribution units of the present disclosure can support a high number of RRUs in a small footprint. Furthermore, the hybrid distribution units of the present disclosure help simplify deployment and accelerate installations as they can be provided pre-terminated (e.g., no cable connections required in the field).

Figure 2A:
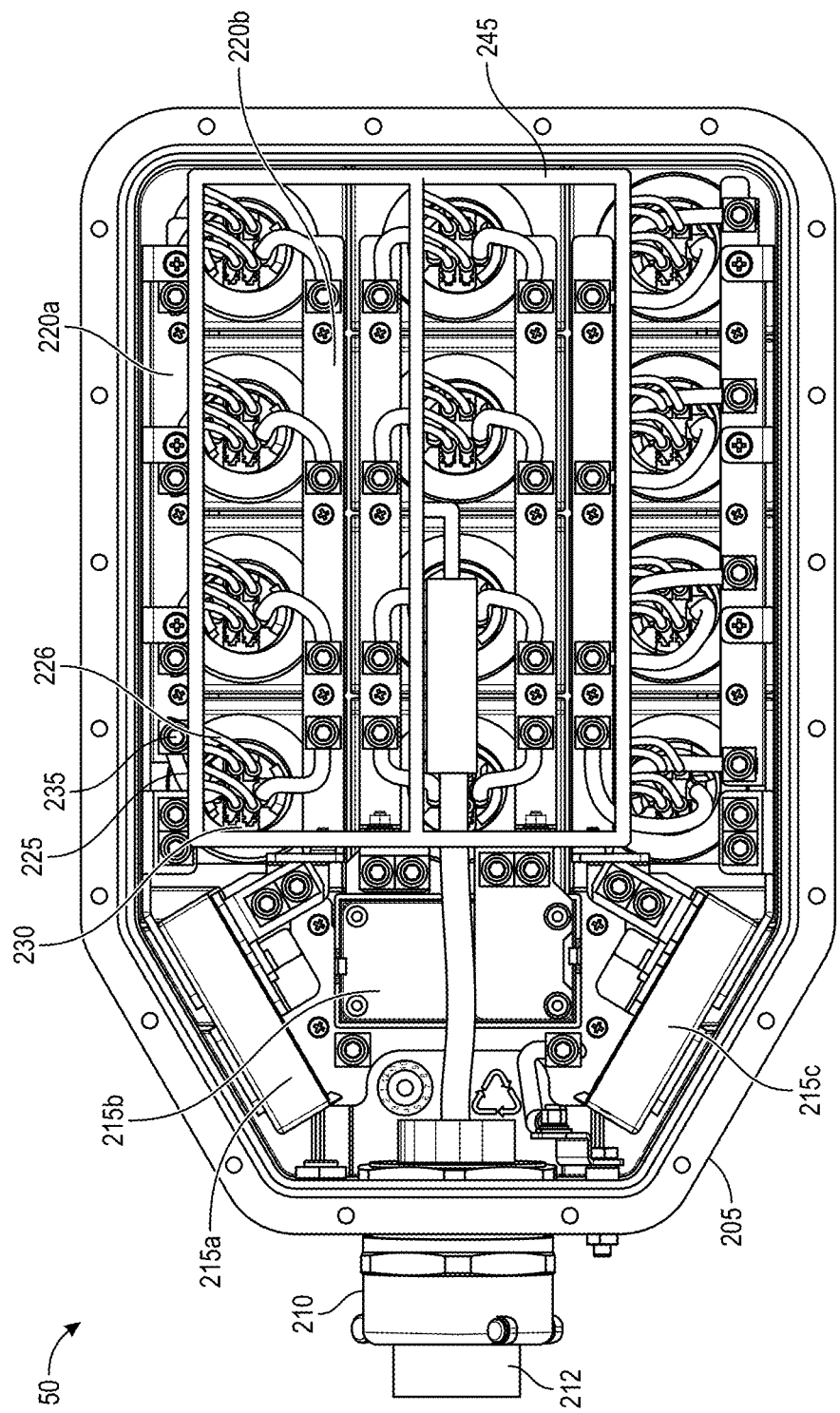
FIGS. 2A, 2B, and 2C illustrate examples of interior views of a hybrid antenna distribution unit in accordance with some embodiments.

FIG. 2A illustrates an interior view of a hybrid antenna distribution unit 50 in accordance with some embodiments. In this example, hybrid distribution unit 50 includes an enclosure 205 having an interior portion as shown. A cable entry and clamping mechanism 210 is disposed at the bottom of the enclosure 205 and is configured to receive a hybrid trunk cable 212 that includes one or more sets of power cables and one or more fiber optic cables. In alternate embodiments, the cable entry and clamping mechanism may be configured to receive separate power and data cables, such as a first trunk cable that includes one or more sets of power cables and a second trunk cable that includes one or more fiber optic cables.

Among other things, the enclosure 205 allows both the factory and field installation of the trunk cable(s) to the hybrid distribution unit 50. For example, in some cases the hybrid distribution unit may be pre-wired and terminated during factory assembly such that an installer is not required to make any cable connections in the field. Additionally or alternatively, a user may remove the external dust cover of the hybrid distribution unit 50 (described in more detail below) to access the internal portion of the enclosure to add or modify wiring connections.

The enclosure may be sized and dimensioned to effectively route power and data cabling while only requiring a minimal footprint on the cellular tower. As shown in FIG. 2A, for example, the enclosure is tapered at the bottom such that the width of the top of the enclosure is wider than the width of the bottom. This helps to conserve space while still providing an efficient and effective routing of the cabling that can easily be accessed by installers or maintenance personnel.

The enclosure 205 may house one or more overvoltage protection (OVP) modules. In the example shown in FIG. 2A, OVP modules 215*a*, 215*b*, and 215*c* are disposed at the bottom of the interior portion of the enclosure, with OVP module 215*a* coupled to a first elongated bus bar 220*a* extending along a portion of the length of enclosure 205 (along the left side of the enclosure) and a second elongated bus bar 220*b* extending along a portion of the length of enclosure 205 parallel to the first bus bar 220*a*. In this example, the first bus bar 220*a* is an input power bus bar (−48V in this example) and the second bus bar 220*b* is a return power bus bar. In FIG. 2A, a ground plate 225 is disposed in the bottom of the enclosure 205 and is configured to extend and connect (e.g., through ground wiring) to the OVP modules 215*a*, 215*b*, and 215*c*.

Figure 2B:
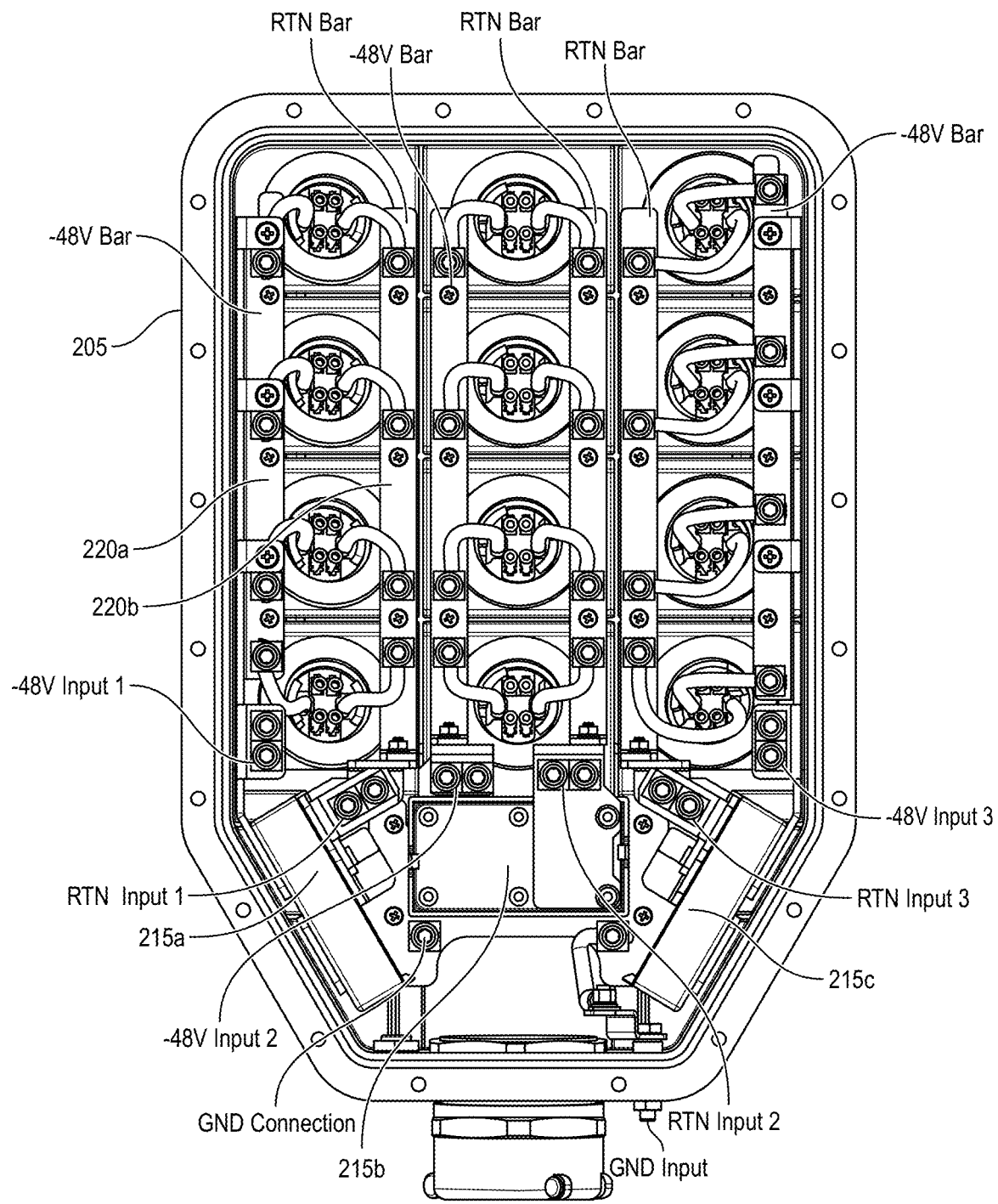

FIG. 2B provides a more detailed view of the power connections within the enclosure 205. In this example, there are three pairs of elongated bus bars (a −48V bar and corresponding return "RTN" bar) running lengthwise within the enclosure, though in alternate embodiments there may be more or fewer sets of bus bars.

As illustrated in FIG. 2B, The power conductors of the hybrid (or power) trunk cable are connected to the terminals of the OVP modules (Strikesorb 1,2,3) at the bottom of the housing. To optimize the cable routing and minimize the assembly and installation time, two bars (−48V and RTN) equipped with lugs are connected to each OVP module and run lengthwise along the housing.

As shown in FIG. 2A, short factory terminated power cables are used for the connection of the bars' lugs to the proper terminals of the hybrid (or power) adaptors. For example, short power cable 225 connects the input power connection from adaptor 230 to the lug 235 on the first bus bar 220*a*.

Figure 2C:
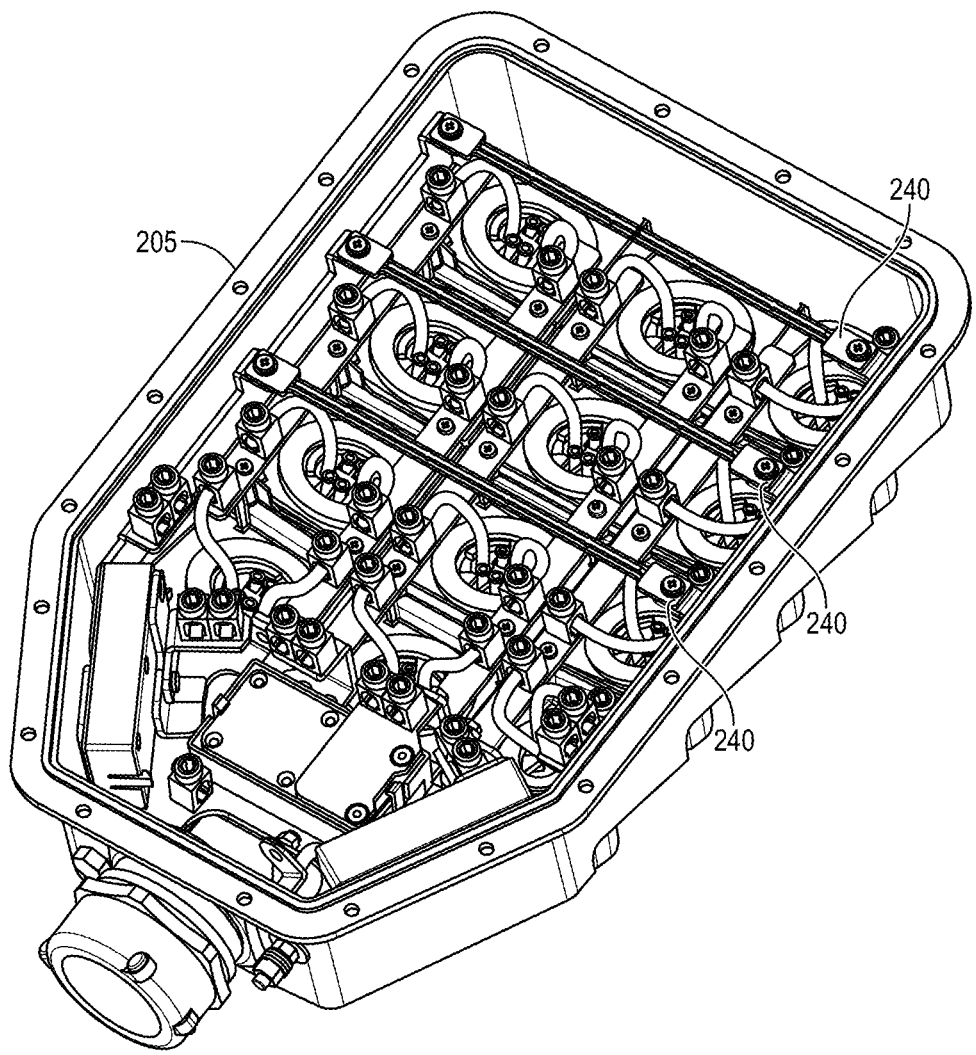

The fiber optic portion of the hybrid cable (or the fiber optic cable in case of separate power and fiber optic trunk cables) is routed above the OVP modules through the interior portion of the enclosure 205. FIG. 2C illustrates the enclosure 205 with the addition of fiber optic cable support elements 240 coupled to opposite sides of the enclosure. The fiber optic cable support elements 240 are configured to retain one or more fiber optic cables using one or more fasteners. In this example, three fiber optic cable support elements 240 are depicted running across the width of the enclosure, but in alternate embodiments more or fewer support elements may be used, and the elements may run in any suitable configuration (e.g., lengthwise) in the enclosure.

Figure 2D:
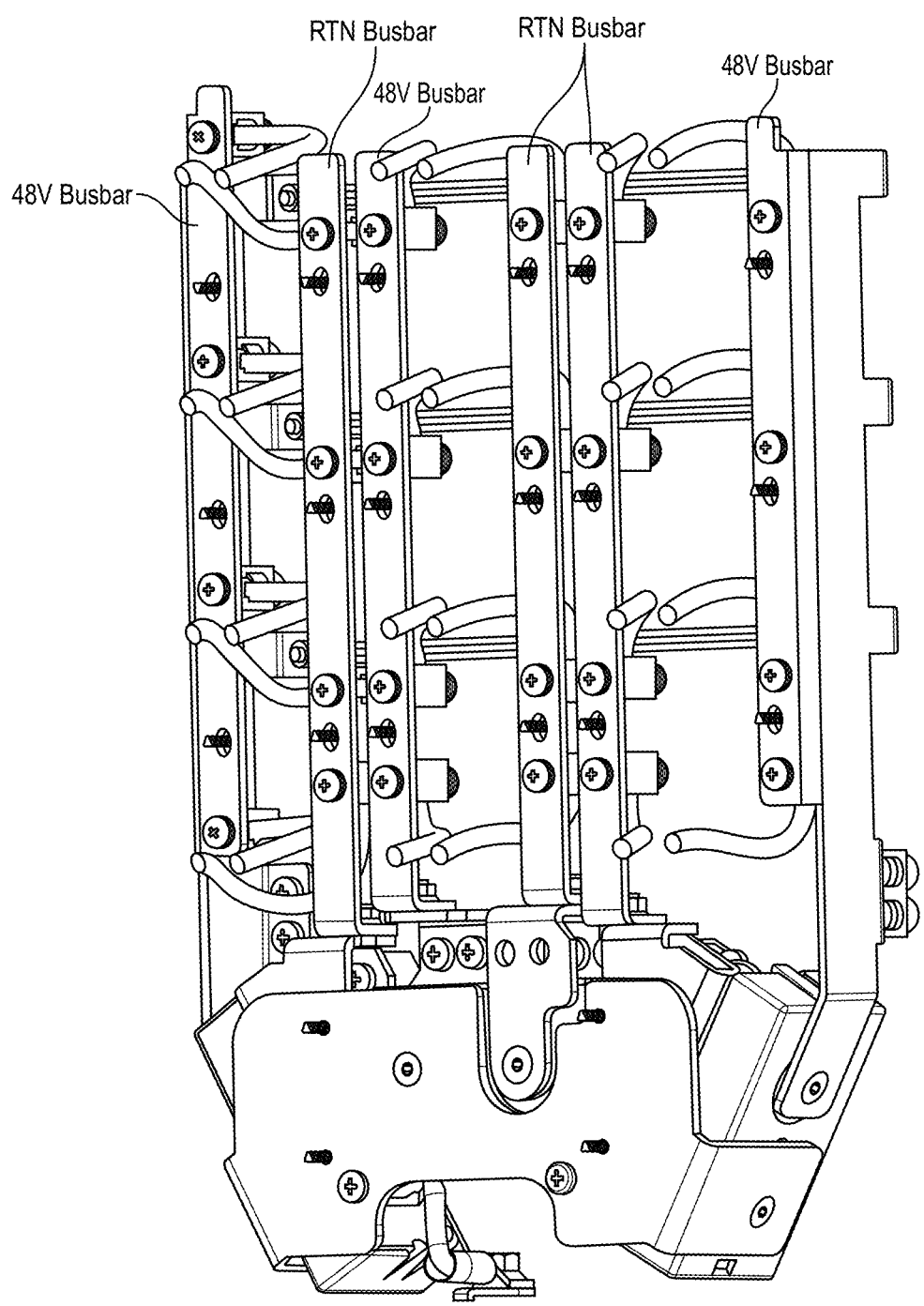
FIGS. 2D, 2E, and 2F are cut-away views of the hybrid antenna distribution unit shown in FIGS. 2A-2C.
Figure 2E:
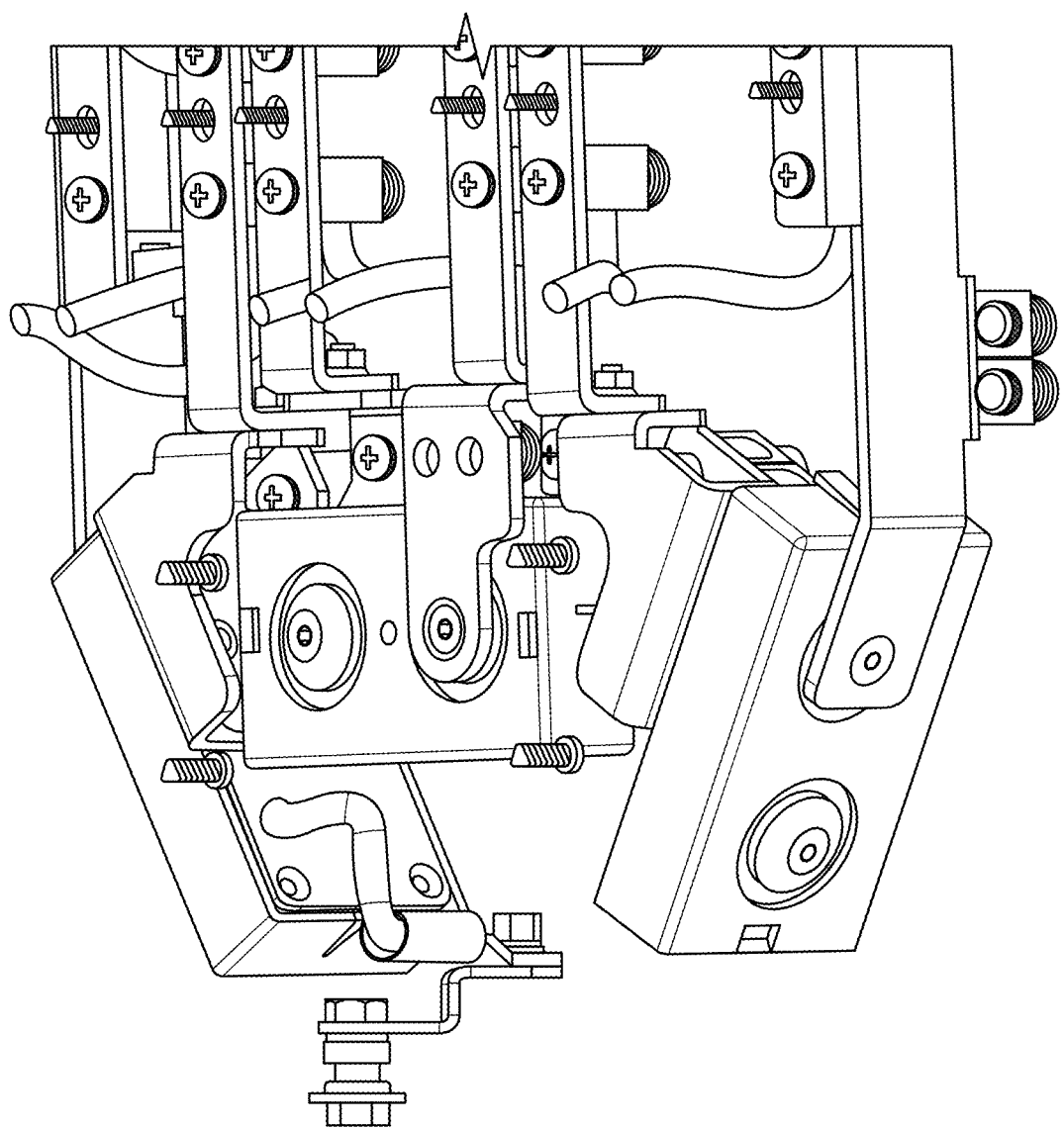
Figure 2F:
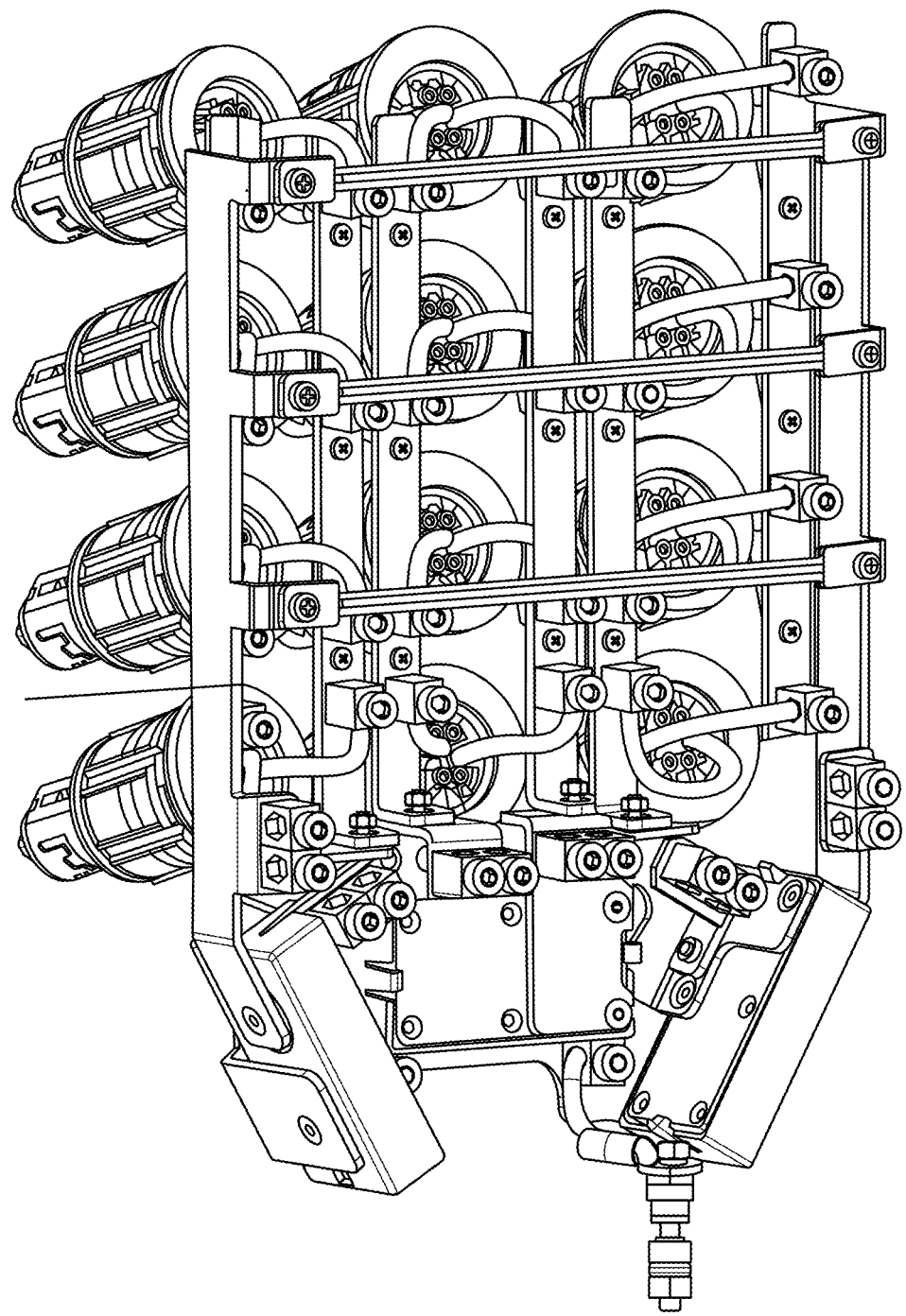

The fiber optic cable support elements 240 allow portions of the fiber optic cables 245 can be fastened to the support elements 240 using, for example, hook-and-loop fasteners coupled to the support elements 240. Additionally, the support elements 240 may be disposed between the fiber optic cabling 245 and the removably attachable dust cover (discussed below) to help protect the fiber optic cable against crimping or other damage during the assembly of the housing. FIGS. 2D, 2E, and 2F are exploded views of the hybrid antenna distribution unit shown in FIGS. 2A-2C.

Figure 3A:
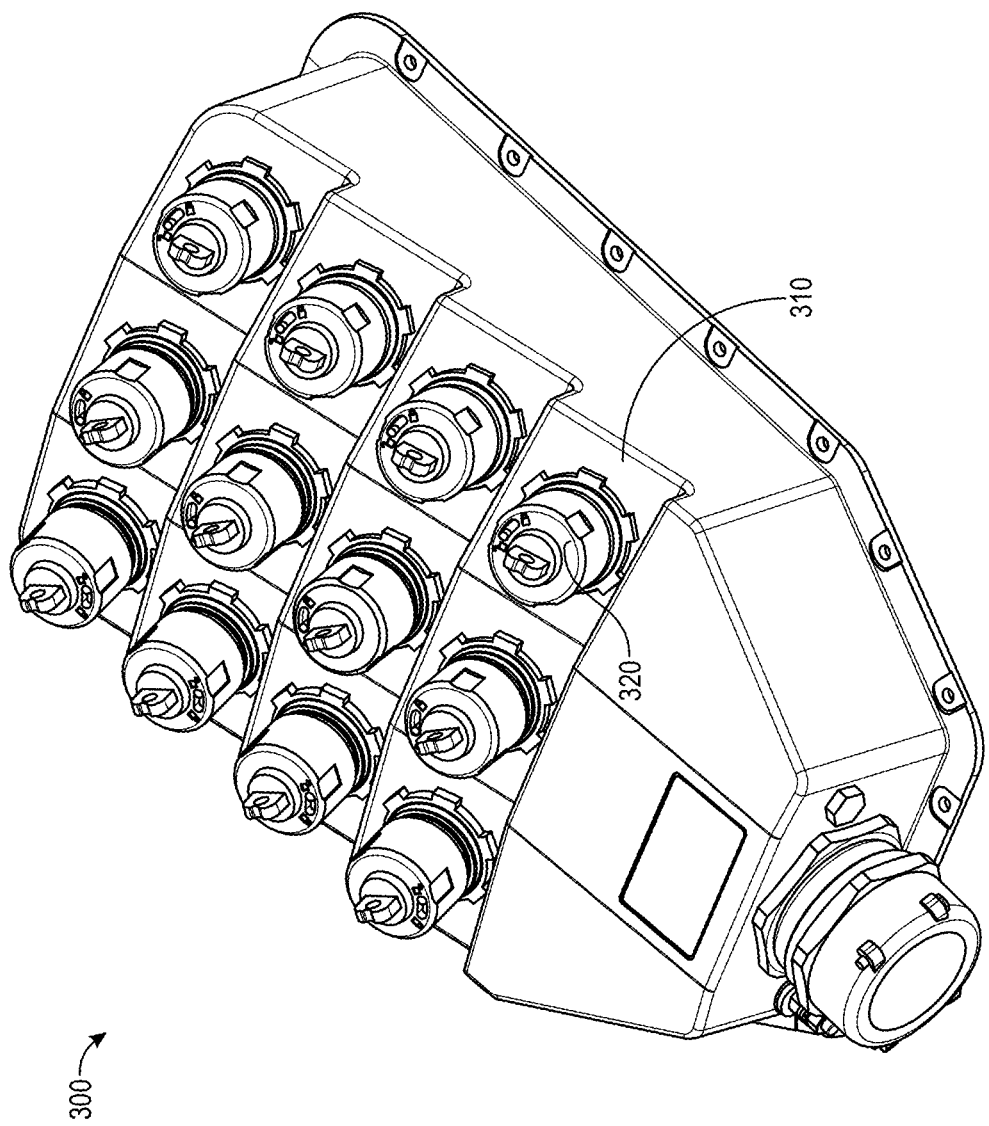
FIGS. 3A and 3B illustrate an example of the exterior portion of a hybrid distribution unit in accordance with various embodiments of the disclosure.
Figure 3B:
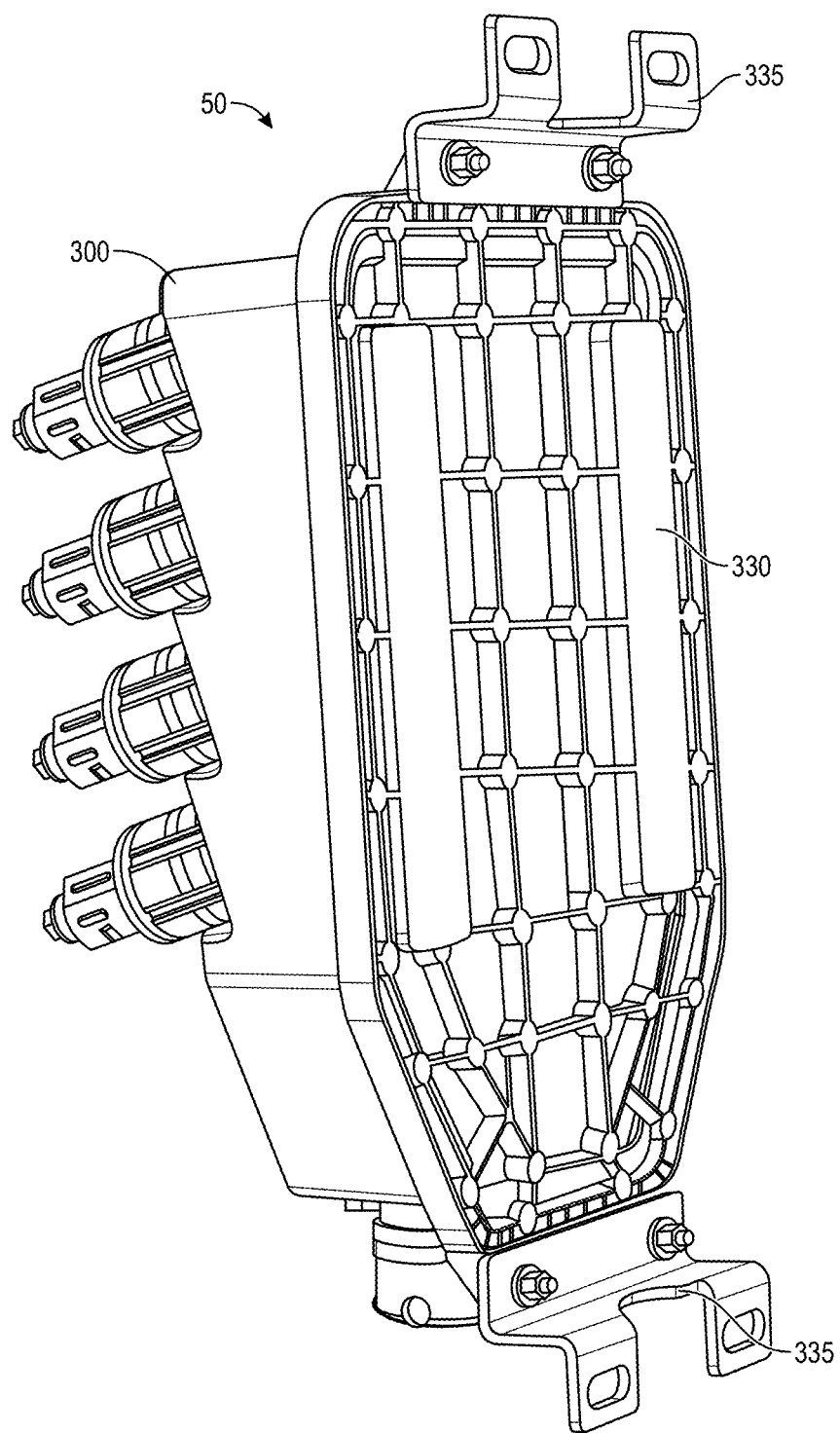

FIGS. 3A and 3B illustrate an example of the exterior portion 300 of hybrid distribution unit 50. In this example, portion 300 may be coupled (e.g., using screws or nuts and bolts around the perimeter of portion 300) to a dust cover 330 that encloses and protects the interior portion of the enclosure 205. The dust cover 330 may also include (or be coupled to) support brackets 335 that allows the hybrid distribution unit 50 to be mounted on the cellular tower 14. FIG. 3E illustrates a cut-away view of the exterior portion of the hybrid distribution unit shown in FIGS. 3A and 3B.

As shown in FIG. 3A, the exterior portion 300 includes a plurality of angled tiered platforms 310, with each platform configured to retain a row of adapters 320. In this example, four angled platforms are shown, each with three adaptors per platform, but alternate embodiments may include more or fewer platforms, and more or fewer adaptors per platform. In this example, the plurality of angled tiered platforms 310 are angled toward the bottom of the enclosure. Among other things, this assists an installer (usually standing below the hybrid distribution unit 50 on a ladder or other support) to connect or disconnect cabling to the adaptors 320.

Figure 3C:
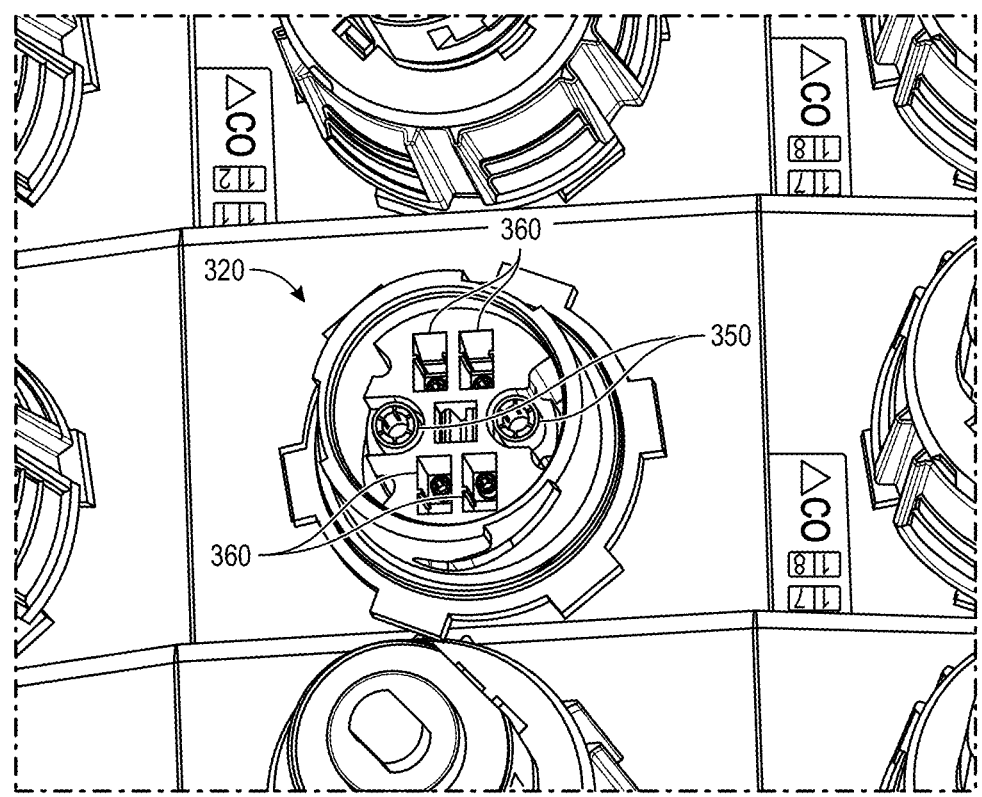
FIG. 3C illustrates an example of a hybrid adaptor in accordance with various embodiments of the disclosure.
Figure 3D:
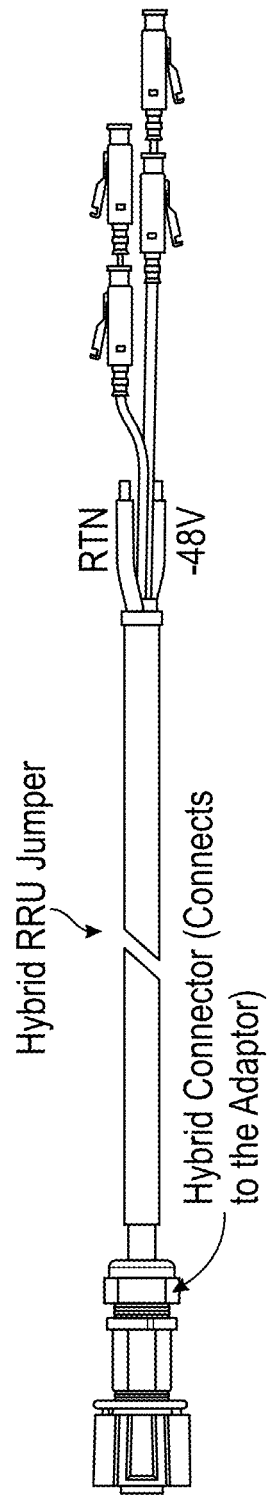
FIG. 3D illustrates an example of a hybrid cable that may be used to connect to the adaptor depicted in FIG. 3C.
Figure 3E:
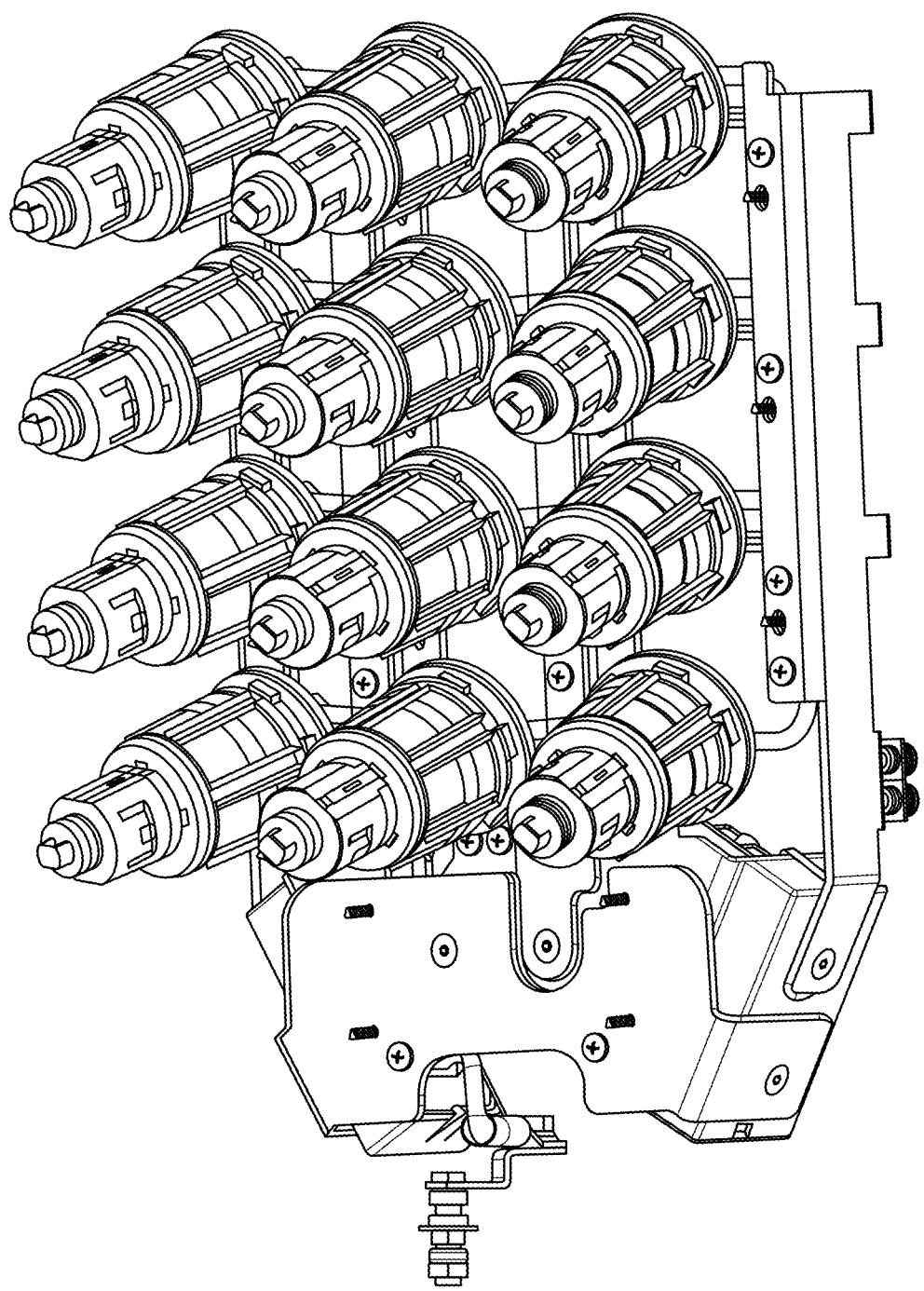
FIG. 3E illustrates a cut-away view of the exterior portion of the hybrid distribution unit shown in FIGS. 3A and 3B.

FIG. 3C illustrates a detailed view of the terminals of a hybrid adaptor 320 that may be used in conjunction with embodiments of the present disclosure. In alternate embodiments, hybrid distribution units of the present disclosure may operate in conjunction with adaptors of any suitable size, shape, and configuration. In the example depicted in FIG. 3C, adaptor 320 includes a pair of power terminals 350, corresponding to an input power terminal and return power terminal as discussed above. The adaptor 320 further includes fiber optic connectors 360. The power terminals 350 and fiber optic terminals 360 connect to the power cables and fiber optic cables, respectively, as shown in the interior view of the hybrid distribution unit 50 in FIG. 2A. For example, power jumper cables (e.g., power jumper cable 225) and fiber optic jumper cables (e.g., fiber optic jumper cable 226) plug into the ends of power terminals 350 and fiber optic terminals 360, respectively. FIG. 3D illustrates an example of a hybrid cable that may be used to connect to the adaptors 320. In this example, the hybrid RRU jumper cable includes supply power (−48) and return (RTN) power lines, along with fiber optic connectors 320. There are two pairs of fiber optic connectors in this example, one pair for the top set of connectors 360 and one for the pair for the bottom set of connectors 360 shown in FIG. 3C.

Figure 4:
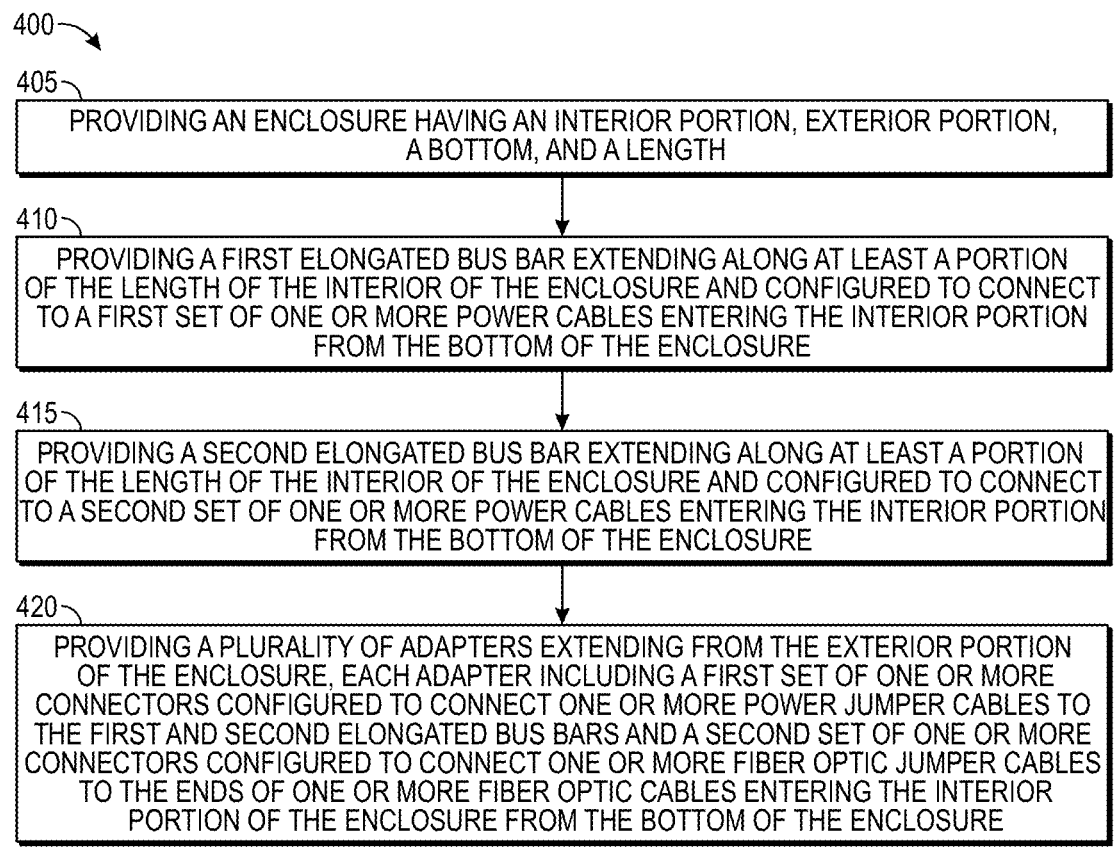
FIG. 4 illustrates an example of a process for manufacturing a hybrid distribution unit in accordance with various embodiments of the disclosure.

FIG. 4 illustrates an example of a process for manufacturing a hybrid distribution unit according to various embodiments. The hybrid distribution units of the present disclosure provide a number of advantages over conventional systems. For example, embodiments of the disclosure help provide both overvoltage protection and fiber/power cabling distribution in a small footprint housing. The mechanical design and the use of bars in the interior of the housing allow the reduction of the required volume for the connection of the cables. The hybrid distribution units of the present disclosure provide space for the safe routing of the fiber optic cables, taking into consideration the minimum bend radius requirements, while also protecting the fiber cabling from damage and doing so with a minimal footprint. Additionally, the hybrid distribution units of this disclosure can either factory terminated or installed in the field, and can be configured to be compatible with a variety of hybrid trunk cabling or stand-alone power/fiber cabling.

Circuit Protection for Hybrid Distribution Units

Figure 8A:
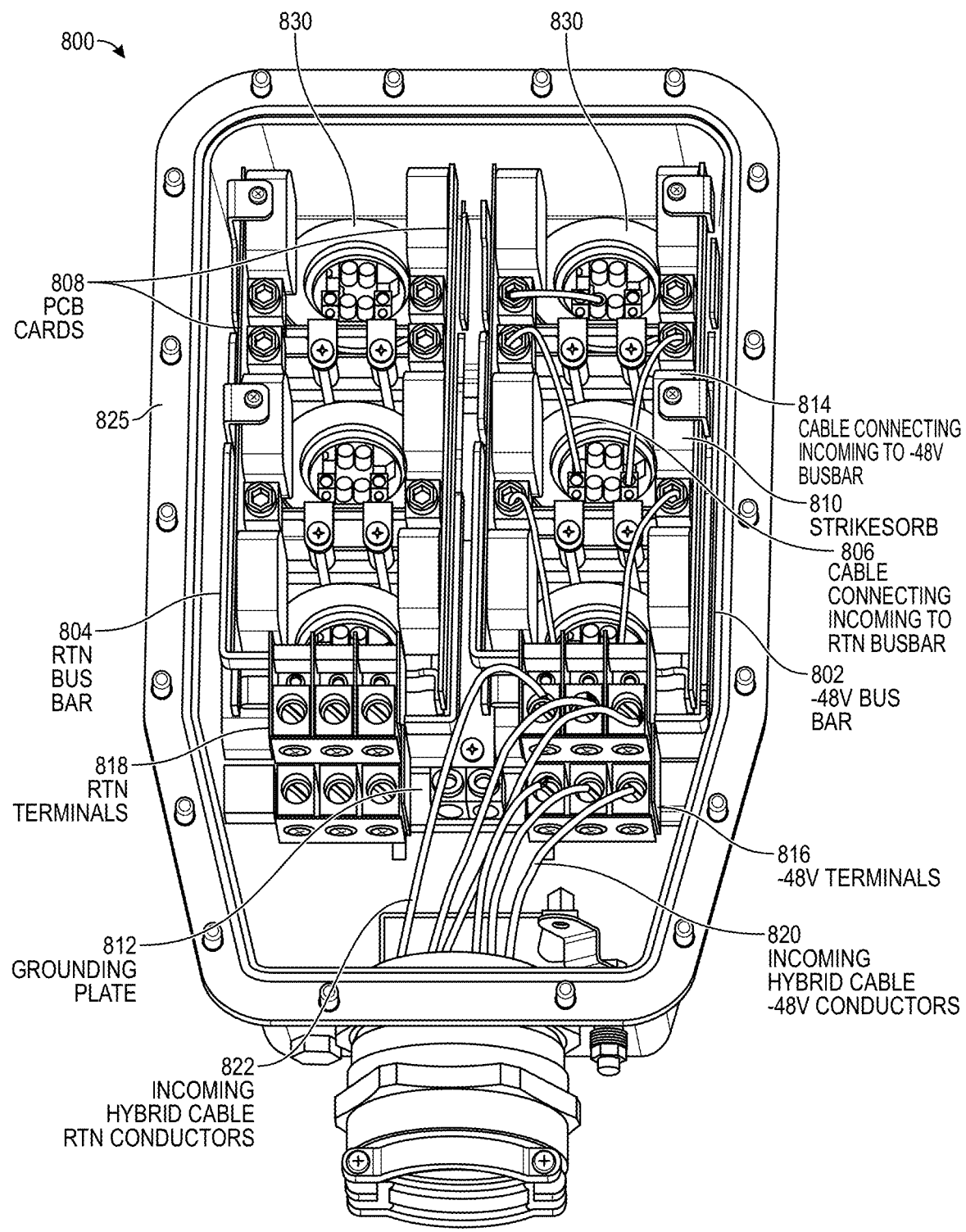
FIGS. 8A-8B illustrate examples of a hybrid distribution unit utilizing overvoltage protection (OVP) modules in accordance with various embodiments of the disclosure.
Figure 8B:
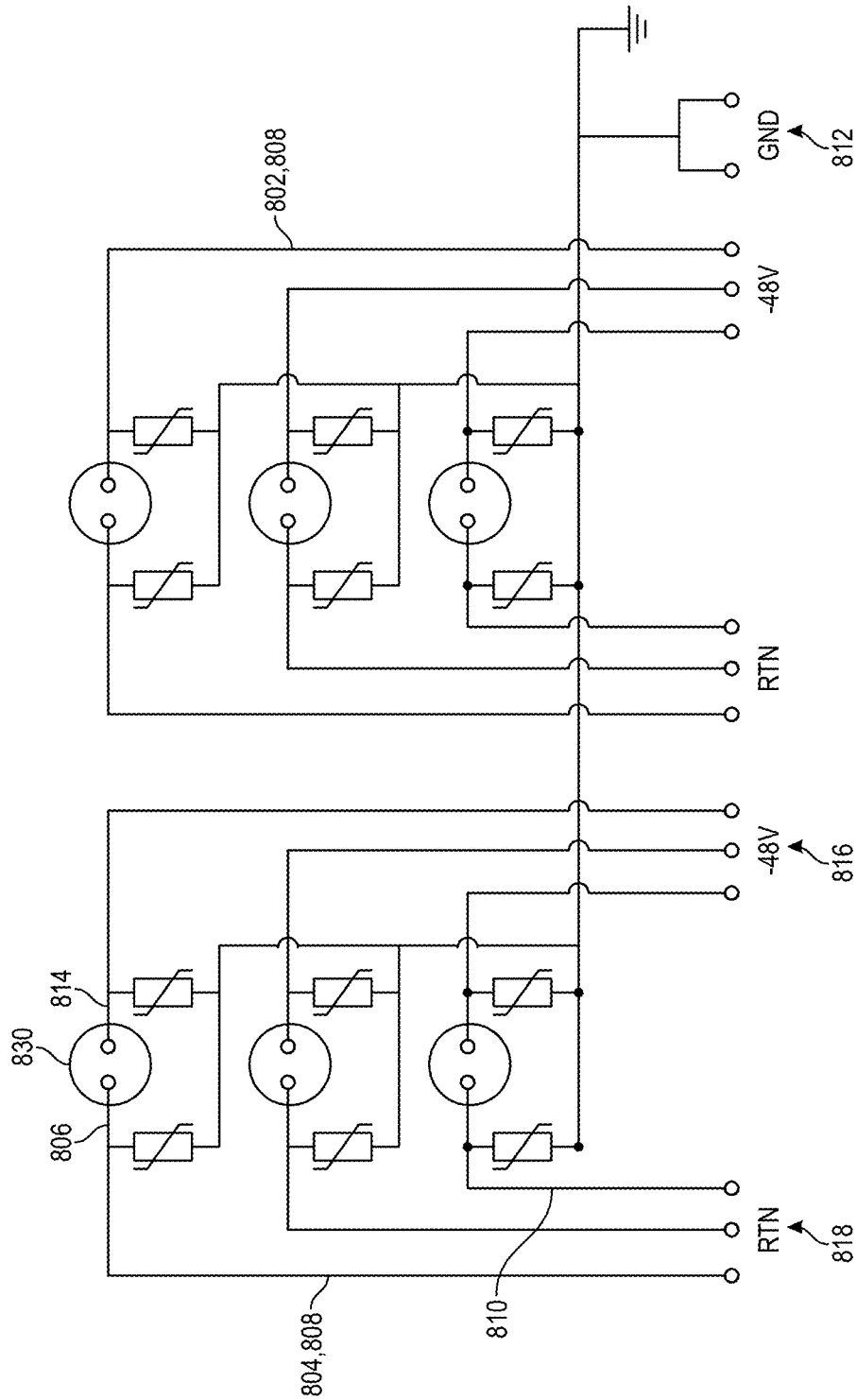

As introduced above, hybrid distribution units of the present disclosure may include one or more overvoltage protection (OVP) modules (e.g., OVP modules 215a, 215b, and 215c in FIG. 2A) to help protect the remote radio units 18. Another example of a hybrid distribution unit utilizing OVP modules is illustrated in FIGS. 8A-8B.

Additionally, some embodiments of hybrid distribution units of the present disclosure may include fuses or circuit breakers to likewise help protect the components of the hybrid distribution units as illustrated in FIGS. 5A-5D, 6A-6D, and 7A-7C.

Figure 5A:
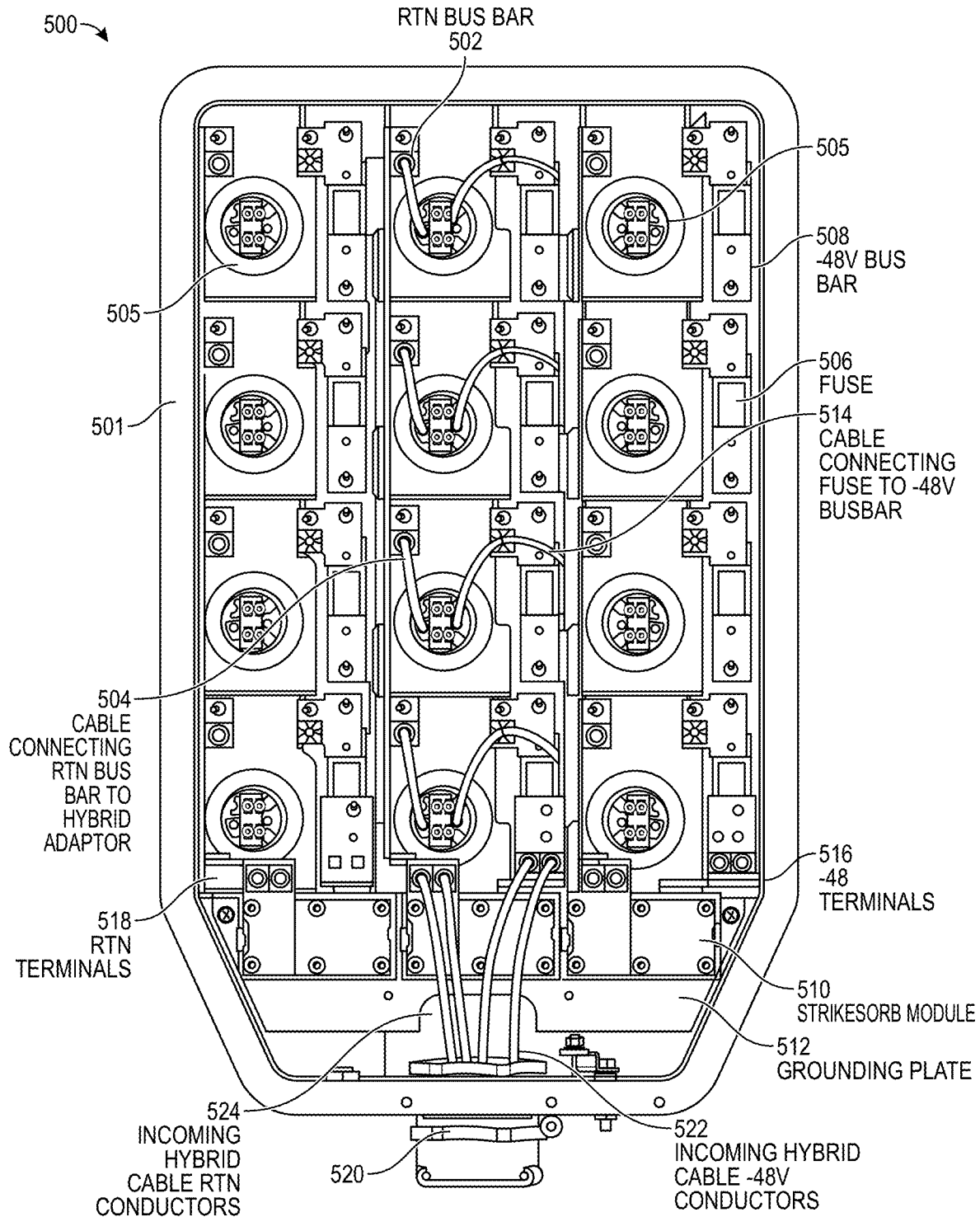

For example, FIG. 5A illustrates an example of a hybrid distribution unit 500 that utilizes fuses to protect the components of the unit 500. In this example, the hybrid distribution unit 500 includes an enclosure 501 having an interior with a first elongated bus bar 508 extending along a portion of the length of the enclosure 501 and a second elongated bus bar 502 extending along a portion of the length of enclosure 508 parallel to the first bus bar 508. As in the example shown in FIG. 2A and described above, the first bus bar 508 is an input power bus bar (−48V in this example) and the second bus bar 502 is a return (RTN) power bus bar.

FIG. 5A also illustrates a plurality of adapters 505, with respective cables 504 for coupling the adapters 505 to the second/return bus bar 504, as well as cables 514 for coupling the adapters 505 to the first/input bus bar 508. Incoming hybrid cable −48V conductors 522 and RTN conductors 524 enter the interior of the enclosure 501 through hybrid cable gland 520. The −48V conductors are coupled to the −48V terminals 516, while the RTN conductors 524 are coupled to the RTN terminals 518.

Figure 5B:
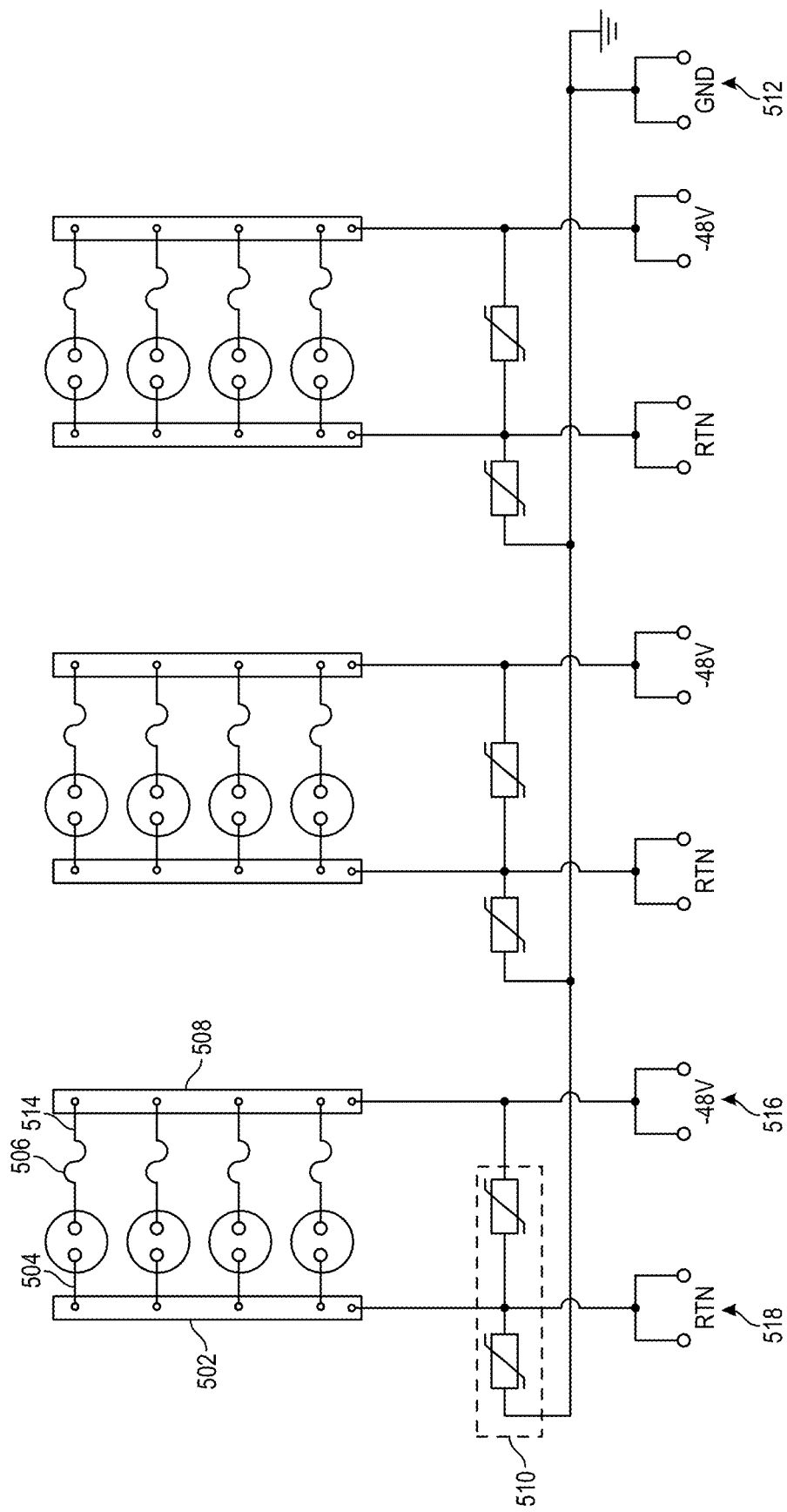

In FIG. 5A, the first/−48V bus bars 508 include respective fuses 506 coupled to the adapters 505. In this examples, the respective fuses 506 are held in receptacles formed in the first/48V bus bars 508 to allow the fuses to be removed and inserted into the receptacles. FIG. 5B illustrates a schematic diagram showing the electrical coupling of the fuses 506 between the adapters 504 and the −48V bus bars 508. Additionally, a grounding plate 512 is disposed in the bottom of the enclosure 501 and is configured to connect to the OVP modules (labeled "Strikesorb modules" in this example) 510.

FIGS. 5C and 5D illustrate front and side views, respectively, of the exterior portion 530 of hybrid distribution unit 500 shown in FIG. 5A. In this example, similar to the examples shown in FIGS. 3A-3B, the exterior portion 530 of the enclosure includes a plurality of angled tiered platforms configured to retain a respective row of hybrid adapters 505. Similar to the dust cover 330 shown in FIG. 3B, a dust cover (not shown) may be removably attached to the hybrid distribution unit 500 to enclose the interior portion 501 of the enclosure.

The exterior portion 530 of the enclosure shown in FIGS. 5C and 5D includes a plurality of protective fuse caps 522, that are removably attached to the exterior portion of the enclosure 530 and covering a respective fuse 506 from the plurality of fuses. In some embodiments, the protective fuse caps 522 may be formed from a material (e.g., plastic) that is at least partially transparent to allow visual inspection of the fuses 506. In this manner, a user may open/remove the protective fuse cap 522 for a particular fuse 506 to remove and replace the fuse 506.

Figure 6A:
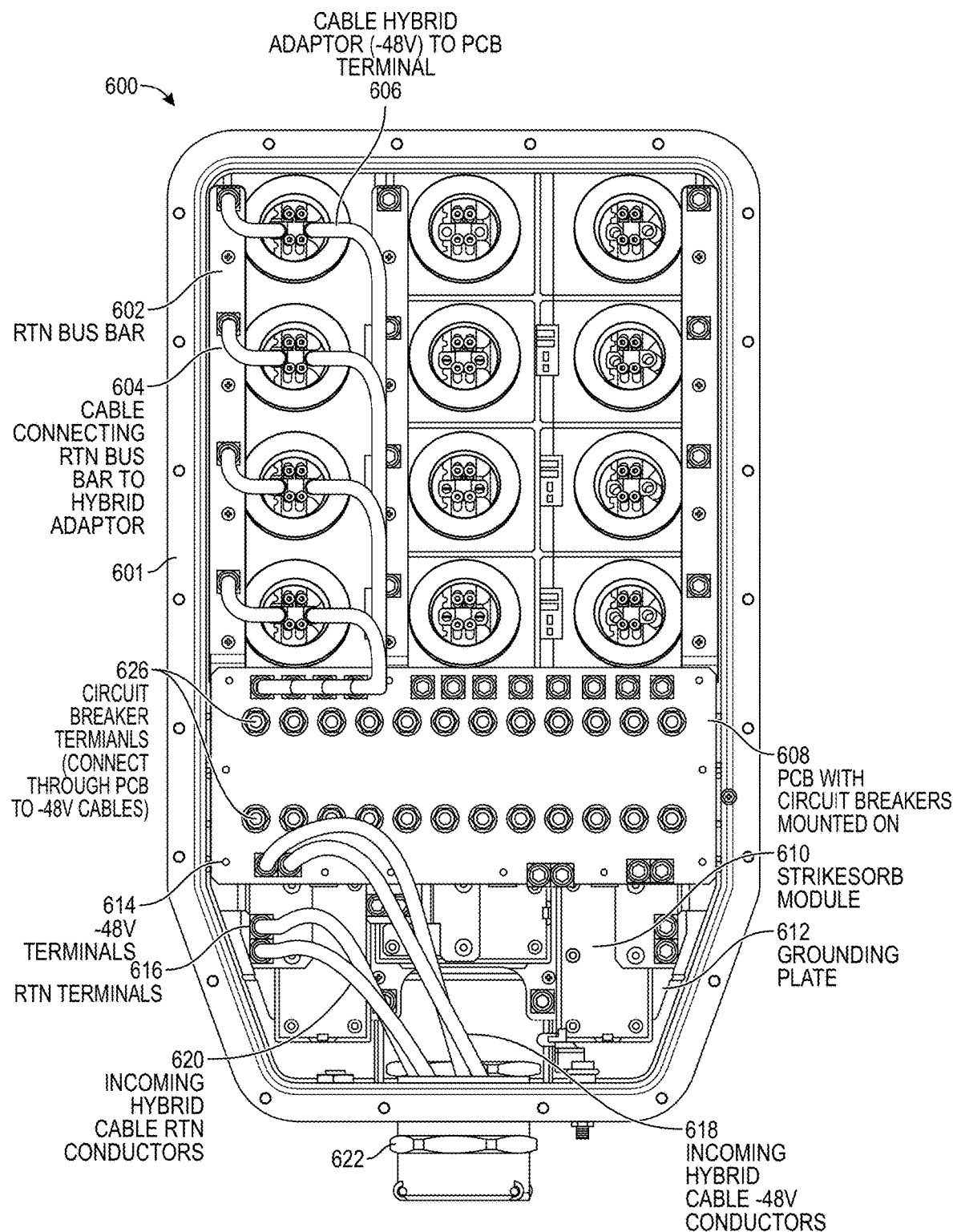
FIGS. 6A-6D illustrate examples of a hybrid distribution unit utilizing circuit breakers in accordance with various embodiments of the disclosure.

FIGS. 6A-6D illustrate an alternative embodiment of a hybrid distribution unit 600 that utilizes circuit breakers to protect the components of the unit 600. In this example, as shown in FIG. 6A, hybrid distribution unit 600 includes an enclosure 601 having an interior with incoming hybrid input (−48V) conductors 618 and incoming hybrid cable return (RTN) conductors 620 received through hybrid cable gland 622. The input/−48V conductors are coupled to −48V terminals 614 on printed circuit board (PCB) 608, which includes circuit breakers mounted thereon.

Figure 6B:
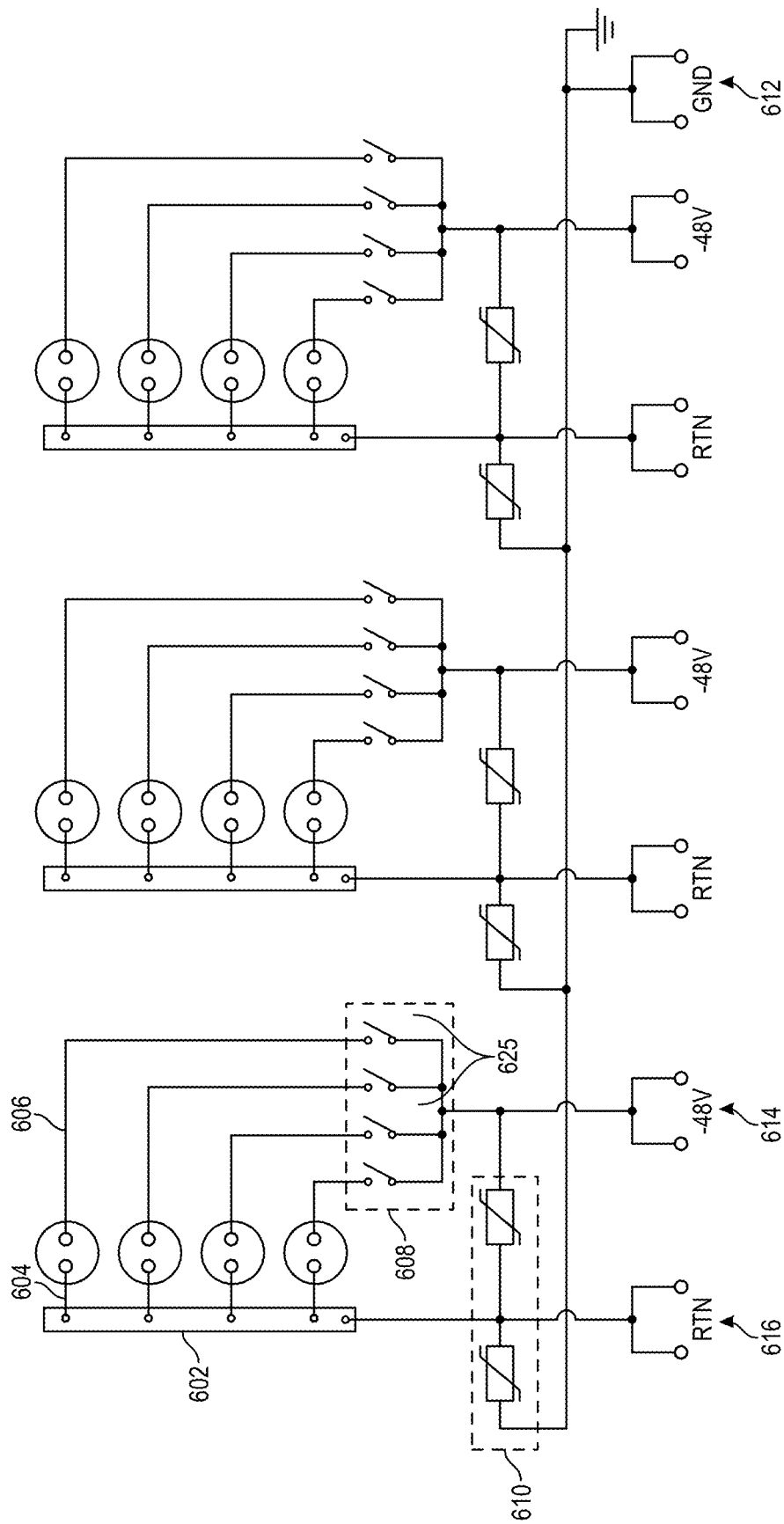

An elongated bus bar 602 extending along a portion of the length of the enclosure 601 is a return (RTN) power bus bar. Adapters 624 are coupled to the RTN bus bar 602 via cables 604 and to the PCB 608 via cables 606, which connect to circuit breaker terminals 626 on the PCB 608, thus putting the circuit breakers between the −48V input conductors 618 and adapters 624. FIG. 6B illustrates a circuit diagram showing the adapters coupled to the RTN bus bar 602 via cables 604 and to the circuit breakers 625 on PCB 608 via cables 606. As further illustrated in FIGS. 6A and 6B, grounding plate 612 disposed within the interior of the enclosure 601 is coupled to the OVP ("Strikesorb") modules 610, −48V terminals 614, and RTN terminals 616.

While the examples shown in FIGS. 6A and 6B illustrate a 1:1 relationship between adapters 624 and circuit breakers 625, in alternate embodiments a single circuit breaker 625 may be coupled to more than one adapter. For example, a circuit breaker 625 may be coupled between the input/−48 power conductors 618 and at least two adapters 624.

Figure 6D:
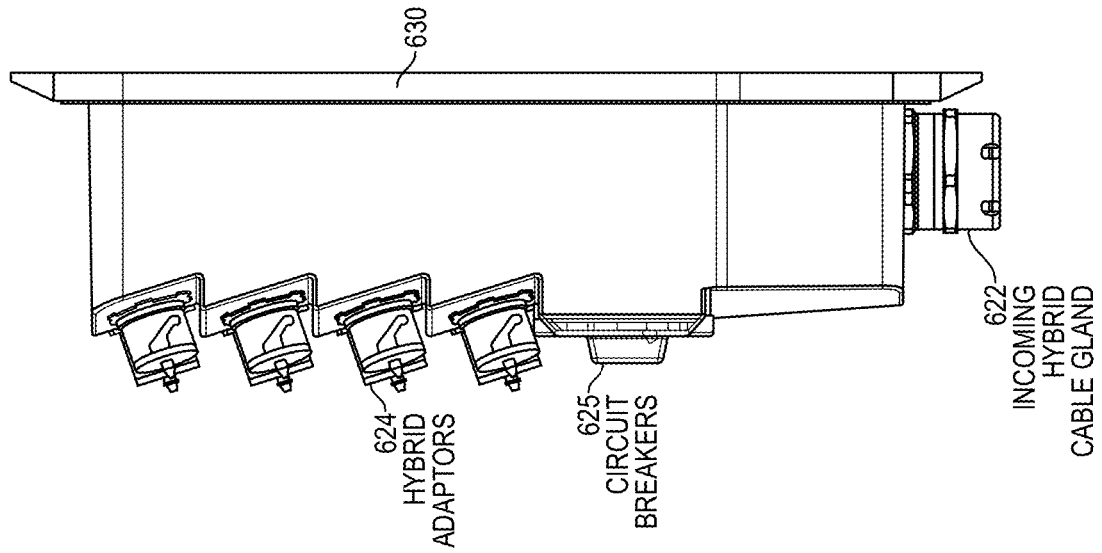
Figure 6C:
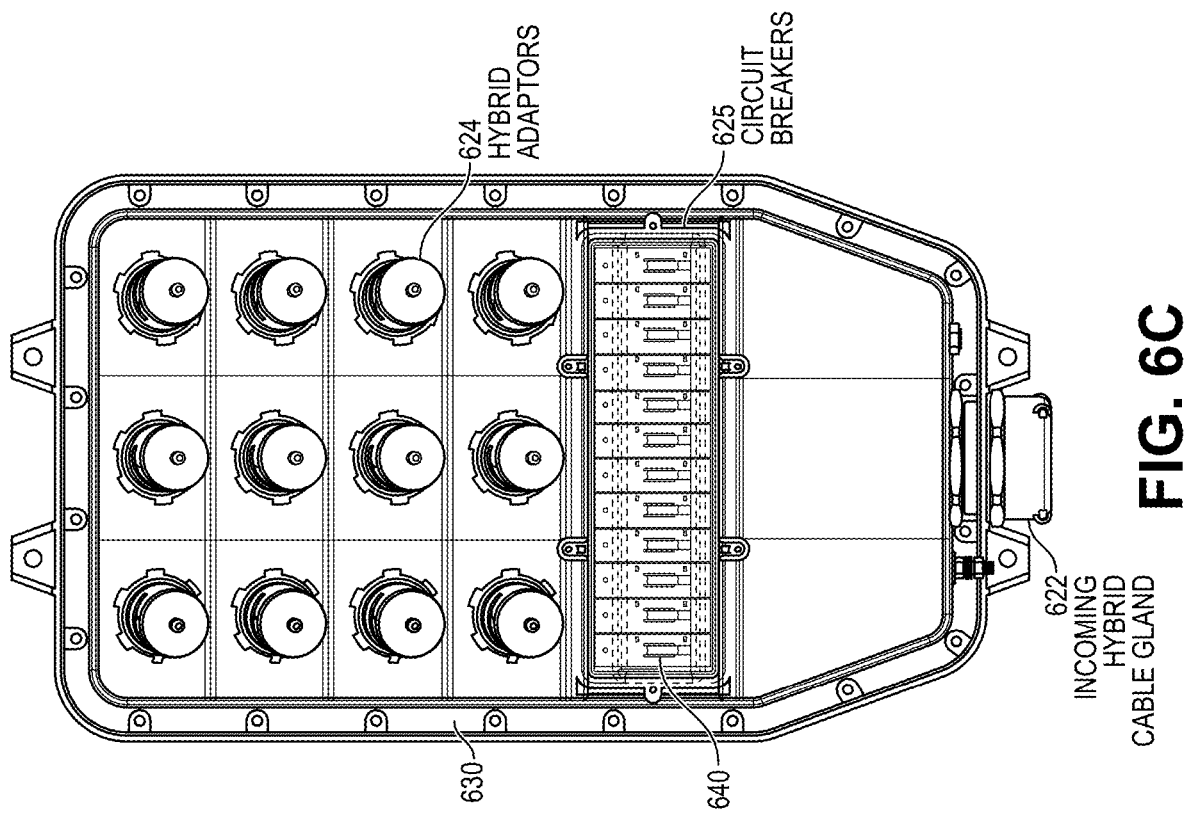

FIGS. 6C and 6D illustrate front and side views, respectively, of the exterior portion 630 of hybrid distribution unit 600 shown in FIG. 6A. In this example, similar to previous hybrid distribution unit examples described above, the exterior portion 630 of the enclosure includes a plurality of angled tiered platforms configured to retain a respective row of hybrid adapters. Similar to the dust cover 330 shown in FIG. 3B, a dust cover (not shown) may be removably attached to the hybrid distribution unit 600 to enclose the interior portion 601 of the enclosure.

The exterior portion 630 of the enclosure shown in FIGS. 6C and 6D illustrates respective switches for the plurality of circuit breakers 625 extending through the exterior portion 630 of the enclosure, with each switch having a closed state or an open (tripped) state. A circuit breaker covering 630 is removably attached to the exterior portion of the enclosure 630 and covers the switches of the circuit breakers 625. In some embodiments, the circuit breaker covering 630 may be formed from a material (e.g., plastic) that is at least partially transparent to allow visual inspection of the switches of the circuit breakers 625. In this manner, a user may open/remove the circuit breaker covering 630 to identify one or more tripped circuit breakers 625 and reset the circuit breakers 625 to their closed state as appropriate.

Figure 7A:
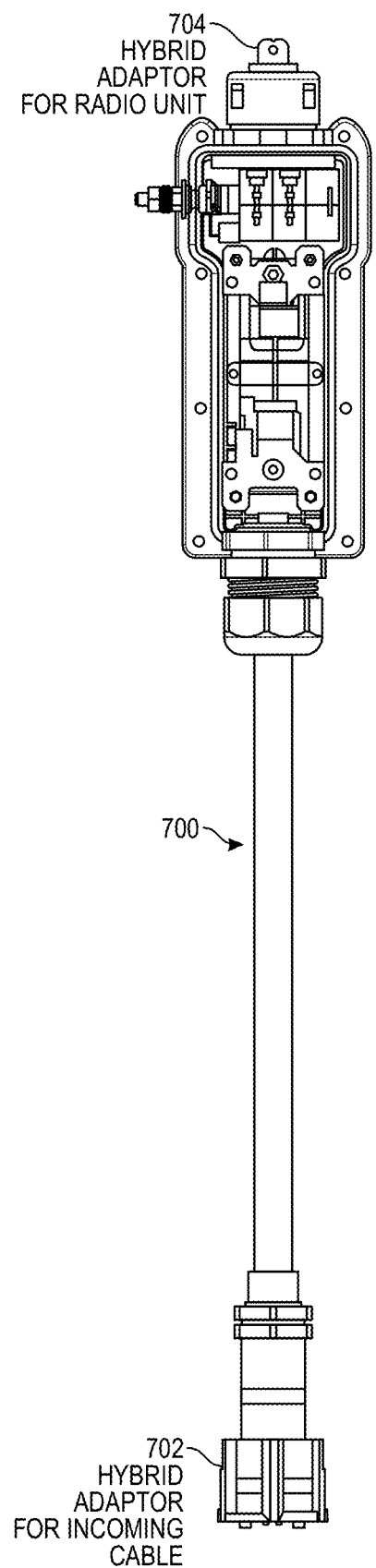
FIGS. 7A-7C illustrate examples of a hybrid cable with fuse protection in accordance with various embodiments of the disclosure.
Figure 7B:
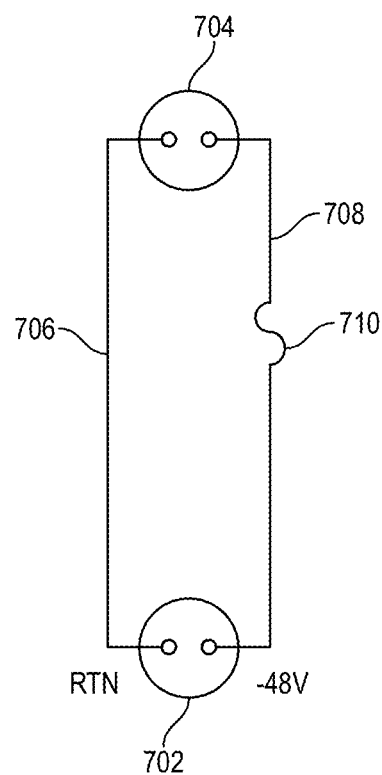
Figure 7C:
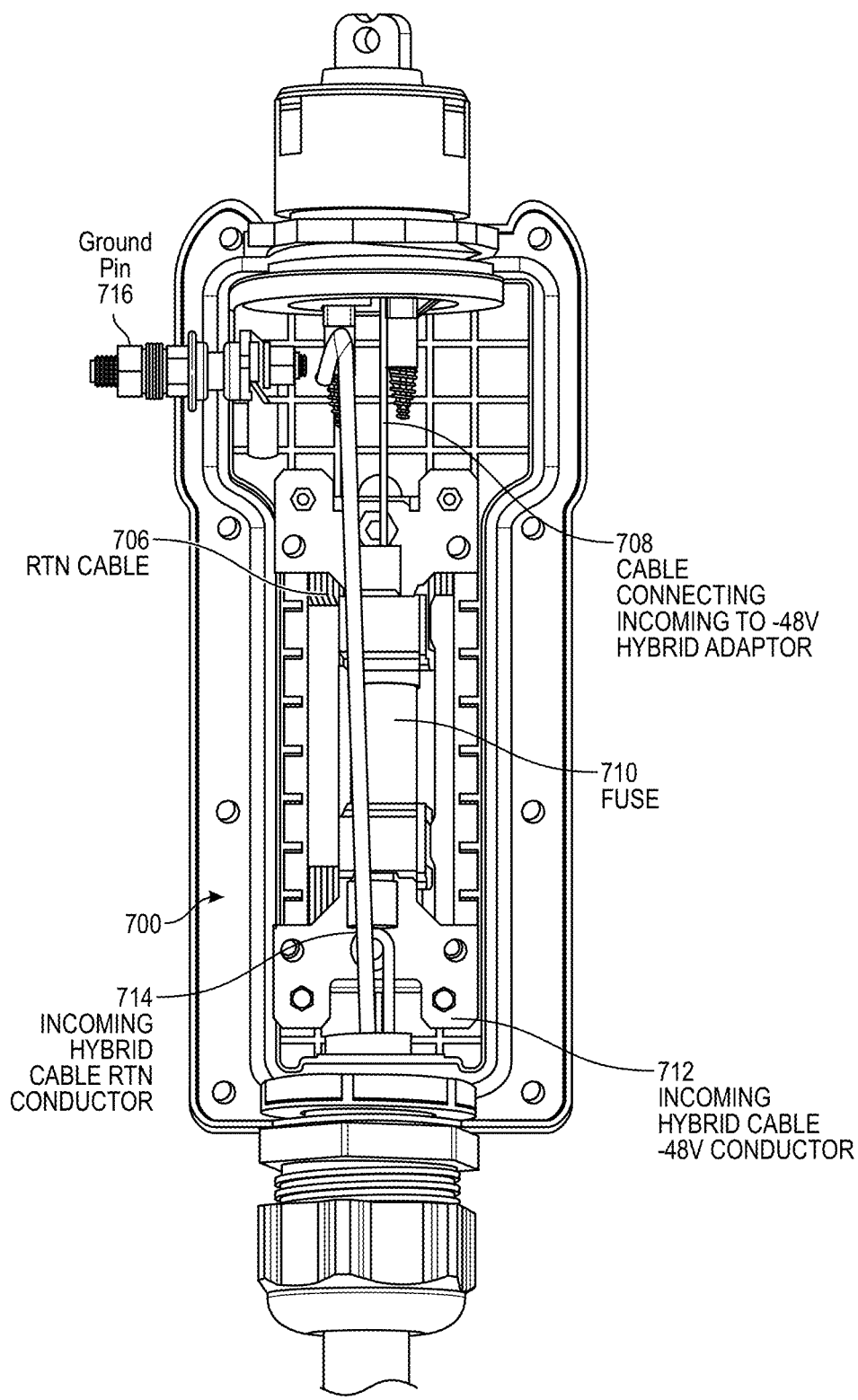

FIGS. 7A-7C illustrate an example of a hybrid jumper cable 700 that may be used to attach to the adapters in any of the hybrid distribution units described herein. In this example, hybrid jumper cable 700 may be coupled to an adapter from the plurality of adapters of a hybrid distribution unit. As shown in FIGS. 7A-7C, hybrid cable 700 includes a supply power line 708, a return power line 706, and one or more fiber optic connectors (not shown).

The hybrid jumper cable 700 further includes one or more fuses 710 coupled to the supply power line 708 or the return power line 706 to help protect a hybrid distribution unit and its associated components. For example, FIG. 7B illustrates a schematic diagram showing an example where fuse 710 is coupled to a −48 supply power line 708, between a hybrid adapter for a radio unit 704 at a first (top) end of the cable 700, and a hybrid adapter for an incoming cable 702 at a second (bottom) end of the cable 700.

FIG. 7C illustrates a close-up cutaway view of the hybrid jumper cable 700, which includes a ground pin 716, an incoming hybrid cable return (RTN) conductor 714, and an incoming hybrid cable supply/−48V conductor 712. Conductors 714 and 712 are coupled to RTN cable 706 and −48V cable 708, respectively. In this example, the fuse 710 is removably attached to a fuse receptacle within the interior portion of the hybrid jumper cable 700, and the receptacle is coupled to the −48V supply line, as illustrated in the schematic in FIG. 7B.

In some embodiments, the hybrid jumper cable 700 may include a cover (not shown) that is removable to access the fuse receptacle to remove/replace the fuse. In some embodiments, the cover may be at least partially transparent to allow visual inspection of the fuse by a user without having to open up the interior portion of the cable 700.

FIGS. 8A-8B illustrate an example of another embodiment of a hybrid distribution unit 800. In this example, hybrid distribution unit 800 includes a first (−48V input) busbar 802 extending along at least a portion of the length of the interior portion of the enclosure 825 and configured to connect to a first set of one or more power cables (incoming hybrid −48V cable conductors 820) entering the interior portion 825. The enclosure 825 further includes a second (return, or RTN) elongated bus bar 804 extending along at least a portion of the length of the interior of the enclosure 825 and configured to connect to a second set of one or more power cables (incoming hybrid cable RTN conductors 822) entering the interior portion 825.

In this example, −48V conductors 820 connect to the −48V bus bar 802 via the −48V terminals 816, while the RTN conductors 822 connect to the RTN bus bar 804 via RTN terminals 818.

Similar to the other hybrid units disclosed above, a plurality of adapters 830 extend from the exterior portion of the enclosure. In this example, the adapters 830 include a first set of one or more connectors (e.g., cables 814 and 806 in this example) configured to connect one or more power jumper cables to the first and second elongated bus bars 802, 804. The adapters 830 further include a second set of one or more connectors (not shown) configured to connect one or more fiber optic jumper cables to the ends of one or more fiber optic cables entering the interior portion of the enclosure (not shown).

In the example illustrated in FIGS. 8A-8B, a first printed circuit board (PCB) 808 is coupled to the first bus bar 802 and includes a first plurality (two in this example) of overvoltage protection (OVP) modules 810 (labeled "Strikesorb"). At least one OVP module 810 from the first plurality of OVP modules is coupled to an adapter 830 from the plurality of adapters.

Similarly, a second PCB 808 is coupled to the second bus bar 804 and includes a second plurality of OVP modules 810, where at least one OVP module from the second plurality of OVP modules is coupled to an adapter from the plurality of adapters.

As with the other hybrid distribution units described herein, alternate embodiments of the present disclosure may include any suitable number of input and return bus bars, adapters, and associated components. In the present example, the distribution unit 800 includes two input bus bars 802 and two return bus bars 804 with associated PCB cards 808. Similar to the other hybrid distribution units described above, the exterior portion of the enclosure 825 may include a plurality of angled tiered platforms (not shown), wherein at least one of the plurality of angled tiered platforms is configured to retain a row of the adapters 830. Likewise, the hybrid distribution unit 830 may additionally include a dust cover that is removably attachable to the hybrid distribution unit apparatus 800 to enclose the interior portion of the enclosure 825.

FIG. 8B illustrates an example of a schematic showing the coupling of the OVP modules 810 to each adapter 830. As shown, each adapter 830 is coupled to a first OVP module 810 on its associated input (−48V) busbar 802 and to a second OVP module 810 on its associated return (RTN) busbar 806. The OVP modules 810 coupled to each adapter 830 are further coupled to grounding plate 812 disposed at the bottom of the enclosure 825.

In some embodiments, one or more of the OVP modules 810 may be removably attached (e.g., using sockets) to the first bus bar 802 or second bus bar 804 to allow replacement of the modules 810. Additionally or alternatively, the PCB cards 808 themselves may be removably attached to their respective bus bars 802, 804 to allow replacement of modules 810.

The figures listed above illustrate examples of embodiments of the application and the operation of such examples. In the figures, the size of the boxes is not intended to represent the size of the various physical components. Where the same element appears in multiple figures, the same reference numeral is used to denote the element in all of the figures where it appears.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A hybrid distribution unit apparatus comprising:
    an enclosure having an interior portion, exterior portion, a bottom, and a length;
    at least two pairs of bus bars each pair comprising:
        a first elongated bus bar extending along at least a portion of the length of the interior portion of the enclosure and configured to connect to a first set of one or more power cables in the interior portion at the bottom of the enclosure;
        a second elongated bus bar extending along at least a portion of the length of the interior of the enclosure and configured to connect to a second set of one or more power cables in the interior portion at the bottom of the enclosure;
    a plurality of adapters extending from the exterior portion of the enclosure, wherein at least one adapter includes a first set of one or more connectors configured to connect one or more power jumper cables to the first and second elongated bus bars and a second set of one or more connectors configured to connect one or more fiber optic jumper cables to ends of one or more fiber optic cables entering the interior portion of the enclosure from the bottom of the enclosure; and
    a plurality of fuses, wherein at least one fuse from the plurality of fuse is coupled between a respective adapter from the plurality of adapters and the first bus bar.

2. The hybrid distribution unit apparatus of claim 1, wherein at least one fuse from the plurality of fuses is removably attached to the first bus bar.

3. The hybrid distribution unit apparatus of claim 1, wherein the exterior portion of the enclosure includes a plurality of angled tiered platforms, wherein at least one of the plurality of angled tiered platforms is configured to retain a row of the adapters.

4. The hybrid distribution unit apparatus of claim 3, further comprising a enclose the interior portion of the enclosure.

5. The hybrid distribution unit apparatus of claim 4, further comprising a plurality of protective fuse caps, wherein at least one protective fuse cap is removably attached to the exterior portion of the enclosure and covering a respective fuse from the plurality of fuses.

6. The hybrid distribution unit apparatus of claim 1, wherein the first bus bar is an input power bus bar and the second bus bar is a return power bus bar.

7. The hybrid distribution unit apparatus of claim 1, further comprising one or more overvoltage protection (OVP) modules disposed within the interior portion of the enclosure and coupled to one or more of the first bus bar and the second bus bar.

8. The hybrid distribution unit apparatus of claim 7, wherein the one or more OVP modules are disposed at the bottom of the interior of the enclosure, and the hybrid distribution unit apparatus further includes a ground plate configured to connect to at least one of the one or more OVP modules.

9. A hybrid distribution unit apparatus comprising:
    an enclosure having an interior portion, exterior portion, a bottom, and a length;
    a plurality of circuit breakers configured to connect to a first set of one or more power cables entering the interior portion from the bottom of the enclosure; wherein the plurality of circuit breakers are coupled to a printed circuit board (PCB) disposed within the interior portion of the hybrid distribution unit;
    at least two pairs of bus bars each pair comprising:
        a first elongated bus bar extending along at least a portion of the length of the interior of the enclosure and configured to connect to a second set of one or more power cables in the interior portion at the bottom of the enclosure;
        a second elongated bus bar extending along at least a portion of the length of the interior of the enclosure and configured to connect to a second set of one or more power cables in the interior portion at the bottom of the enclosure; and
    a plurality of adapters extending from the exterior portion of the enclosure, wherein at least one adapter includes a first set of one or more connectors configured to connect one or more power jumper cables to the elongated bus bar and the plurality of circuit breakers, and a second set of one or more connectors configured to connect one or more fiber optic jumper cables to ends of one or more fiber optic cables entering the interior portion of the enclosure from the bottom of the enclosure.

10. The hybrid distribution unit apparatus of claim 9, wherein at least one respective circuit breaker from the plurality of circuit breakers is coupled between the first set of one or more power cables and a respective adapter from the plurality of adapters.

11. The hybrid distribution unit apparatus of claim 9, wherein at least one respective circuit breaker from the plurality of circuit breakers is coupled between the first set of one or more power cables and at least two adapters from the plurality of adapters.

12. The hybrid distribution unit apparatus of claim 9, wherein the first set of one or more power cables is coupled to the PCB.

13. The hybrid distribution unit apparatus of claim 9, wherein the exterior portion of the enclosure includes a plurality of angled tiered platforms, wherein at least one of the plurality of angled tiered platforms is configured to retain a row of the adapters.

14. The hybrid distribution unit apparatus of claim 9, further comprising a enclose the interior portion of the enclosure.

15. The hybrid distribution unit apparatus of claim 9, wherein the plurality of circuit breakers include a respective switch extending through the exterior portion of the enclosure.

16. The hybrid distribution unit apparatus of claim 15, further comprising a circuit breaker covering removably attached to the exterior portion of the enclosure and covering the plurality of circuit breakers.

17. The hybrid distribution unit apparatus of claim 9, wherein the bus bar is a return power bus bar.

18. A hybrid distribution unit apparatus comprising:
an enclosure having an interior portion, exterior portion, a bottom, and a length;
at least two pairs of bus bars each pair comprising:
a first elongated bus bar extending along at least a portion of the length of the interior portion of the enclosure and configured to connect to a first set of one or more power cables in the interior portion at the bottom of the enclosure;
a second elongated bus bar extending along at least a portion of the length of the interior of the enclosure and configured to connect to a second set of one or more power cables in the interior portion at the bottom of the enclosure;
a plurality of adapters extending from the exterior portion of the enclosure, wherein at least one adapter includes a first set of one or more connectors configured to connect one or more power jumper cables to the first and second elongated bus bars and a second set of one or more connectors configured to connect one or more fiber optic jumper cables to ends of one or more fiber optic cables entering the interior portion of the enclosure from the bottom of the enclosure; and
a hybrid jumper cable coupled to an adapter from the plurality of adapters that includes a supply power line, a return power line, and one or more fiber optic connectors, wherein the hybrid jumper cable includes one or more fuses coupled to the supply power line or the return power line.

19. The hybrid distribution unit apparatus of claim 18, wherein the one or more fuses include a fuse removably attached to a fuse receptacle within an interior portion of the hybrid jumper cable.

20. The hybrid distribution unit apparatus of claim 19, wherein the hybrid jumper cable includes a cover that is removable to access the fuse receptacle.

21. The hybrid distribution unit apparatus of claim 18, wherein the hybrid jumper cable is configurable to couple to the adapter from the plurality of adapters at a first end of the hybrid jumper cable, and to a radio unit at a second end of the hybrid jumper cable.

22. The hybrid distribution unit apparatus of claim 18, wherein the supply power line is a −48V power line.

23. A hybrid distribution unit apparatus comprising:
an enclosure having an interior portion, exterior portion, a bottom, and a length;
at least two pairs of bus bars each pair comprising:
a first elongated bus bar extending along at least a portion of the length of the interior portion of the enclosure and configured to connect to a first set of one or more power cables in the interior portion at the bottom of the enclosure;
a second elongated bus bar extending along at least a portion of the length of the interior of the enclosure and configured to connect to a second set of one or more power cables in the interior portion at the bottom of the enclosure;
a plurality of adapters extending from the exterior portion of the enclosure, wherein at least one adapter includes a first set of one or more connectors configured to connect one or more power jumper cables to the first and second elongated bus bars and a second set of one or more connectors configured to connect one or more fiber optic jumper cables to ends of one or more fiber optic cables entering the interior portion of the enclosure from the bottom of the enclosure;
a first printed circuit board (PCB) coupled to the first bus bar and including a first plurality of overvoltage protection (OVP) modules, wherein at least one OVP module from the first plurality of OVP modules is coupled to an adapter from the plurality of adapters; and
a second printed circuit board (PCB) coupled to the second bus bar and including a second plurality of OVP modules, wherein at least one OVP module from the second plurality of OVP modules is coupled to an adapter from the plurality of adapters.

24. The hybrid distribution unit apparatus of claim 23, wherein at least one OVP module from the first plurality of OVPs is removably attached to the first bus bar.

25. The hybrid distribution unit apparatus of claim 23, wherein at least one OVP module from the second plurality of OVPs is removably attached to the second bus bar.

26. The hybrid distribution unit apparatus of claim 23, wherein at least one OVP module from the first plurality of OVPs is removably attached to the first bus bar.

27. The hybrid distribution unit apparatus of claim 23, wherein the exterior portion of the enclosure includes a plurality of angled tiered platforms, wherein at least one of the plurality of angled tiered platforms is configured to retain a row of the adapters.

28. The hybrid distribution unit apparatus of claim 23, further comprising a enclose the interior portion of the enclosure.

29. The hybrid distribution unit apparatus of claim 23, wherein an OVP module from the first plurality of OVP modules and an OVP module from the second plurality of OVP modules are coupled to a common adapter from the plurality of adapters.

30. The hybrid distribution unit apparatus of claim 23, wherein the first bus bar is an input power bus bar and the second bus bar is a return power bus bar.

31. The hybrid distribution unit apparatus of claim 23, wherein the hybrid distribution unit apparatus further includes a ground plate configured to connect to at least one OVP module from the first plurality of OVP modules or the second plurality of OVP modules.

* * * * *